(12) United States Patent
Komatsu

(10) Patent No.: US 8,964,305 B2
(45) Date of Patent: Feb. 24, 2015

(54) ZOOM LENS AND IMAGING APPARATUS

(71) Applicant: FUJIFILM Corporation, Tokyo (JP)

(72) Inventor: Daiki Komatsu, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/044,445

(22) Filed: Oct. 2, 2013

(65) Prior Publication Data
US 2014/0036138 A1   Feb. 6, 2014

Related U.S. Application Data

(63) Continuation of application No. PCT/JP2012/002352, filed on Apr. 4, 2012.

(30) Foreign Application Priority Data

Apr. 5, 2011   (JP) ................................. 2011-083286

(51) Int. Cl.
| | | |
|---|---|---|
| *G02B 15/14* | (2006.01) | |
| *H04N 5/225* | (2006.01) | |
| *G02B 15/16* | (2006.01) | |
| *G02B 13/18* | (2006.01) | |
| *H04N 5/232* | (2006.01) | |
| *G02B 15/173* | (2006.01) | |

(52) U.S. Cl.
CPC ............... *G02B 15/16* (2013.01); *G02B 13/18* (2013.01); *H04N 5/2254* (2013.01); *H04N 5/23296* (2013.01); *G02B 15/173* (2013.01)
USPC .......................................... 359/687; 348/345

(58) Field of Classification Search
CPC ...... G02B 15/16; G02B 15/173; G02B 13/18; H04N 5/2254; H04N 5/23296
USPC ........................... 348/345; 359/683, 684, 687
See application file for complete search history.

(56) References Cited

U.S. PATENT DOCUMENTS

| 7,227,699 B2 | 6/2007 | Hamano et al. |
| 2006/0291071 A1 | 12/2006 | Ohtake |

(Continued)

FOREIGN PATENT DOCUMENTS

| JP | 2006-047771 | 2/2006 |
| JP | 2007-003776 | 1/2007 |

(Continued)

OTHER PUBLICATIONS

English-language translation of International Preliminary Report on Patentability (PCT/IPEA/409) prepared for PCT/JP2012/002352 (Jul. 2012).*

(Continued)

*Primary Examiner* — David N Spector
(74) *Attorney, Agent, or Firm* — Young & Thompson

(57) ABSTRACT

A zoom lens consists of a positive first lens group, a negative second lens group, a positive third lens group, and a positive fourth lens group, which are arranged in this order from an object side. When magnification is changed from wide angle end to telephoto end, the first lens group and the third lens group are fixed, and the second lens group moves toward an image side, and the fourth lens group moves. The first lens group consists of a cemented lens of a negative lens and a positive lens, and two positive lenses, which are in this order from the object side. The third lens group consists of a negative partial lens group including a cemented lens, and a positive partial lens group, which are in this order from the object side.

16 Claims, 9 Drawing Sheets

(56) References Cited

U.S. PATENT DOCUMENTS

| | | |
|---|---|---|
| 2007/0279763 A1 | 12/2007 | Hoshi |
| 2007/0279764 A1 | 12/2007 | Hoshi |
| 2010/0246002 A1 | 9/2010 | Hagiwara |
| 2010/0254024 A1 | 10/2010 | Hagiwara |

FOREIGN PATENT DOCUMENTS

| | | |
|---|---|---|
| JP | 2007-033553 | 2/2007 |
| JP | 2007-127694 | 5/2007 |
| JP | 2007-212847 | 8/2007 |
| JP | 2007-322635 | 12/2007 |
| JP | 2007-322636 | 12/2007 |
| JP | 2010-237456 | 10/2010 |
| JP | 2010-256845 | 11/2010 |

OTHER PUBLICATIONS

International Search Report, PCT/JP2012/002352, Jul. 24, 2012.

* cited by examiner

EXAMPLE 1

EXAMPLE 2

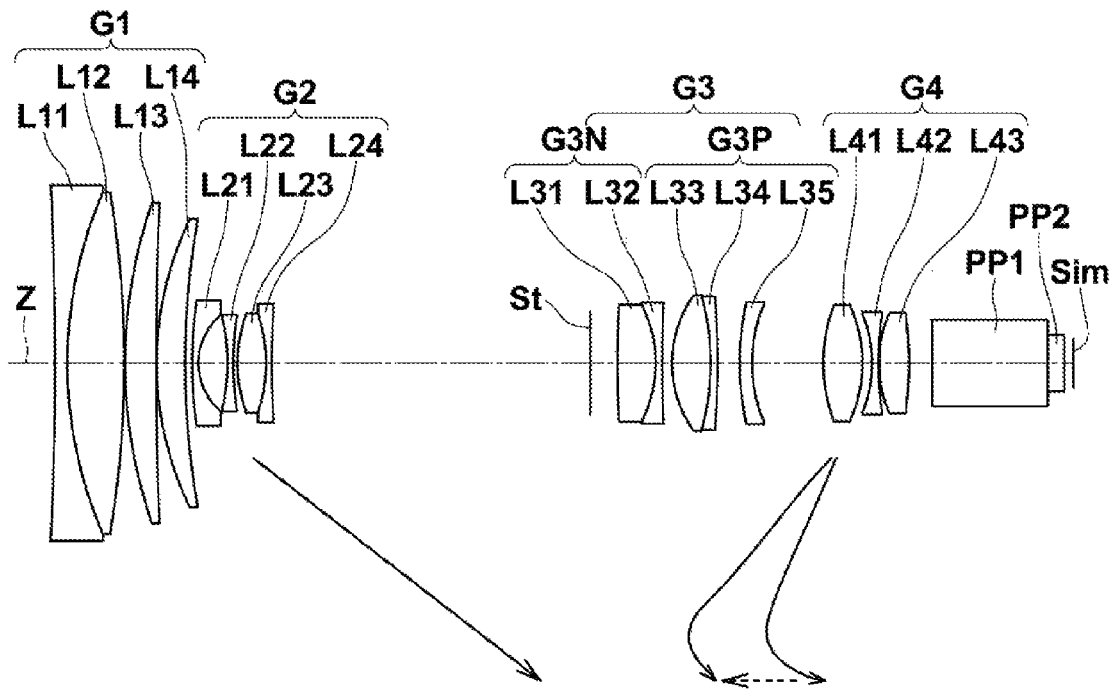
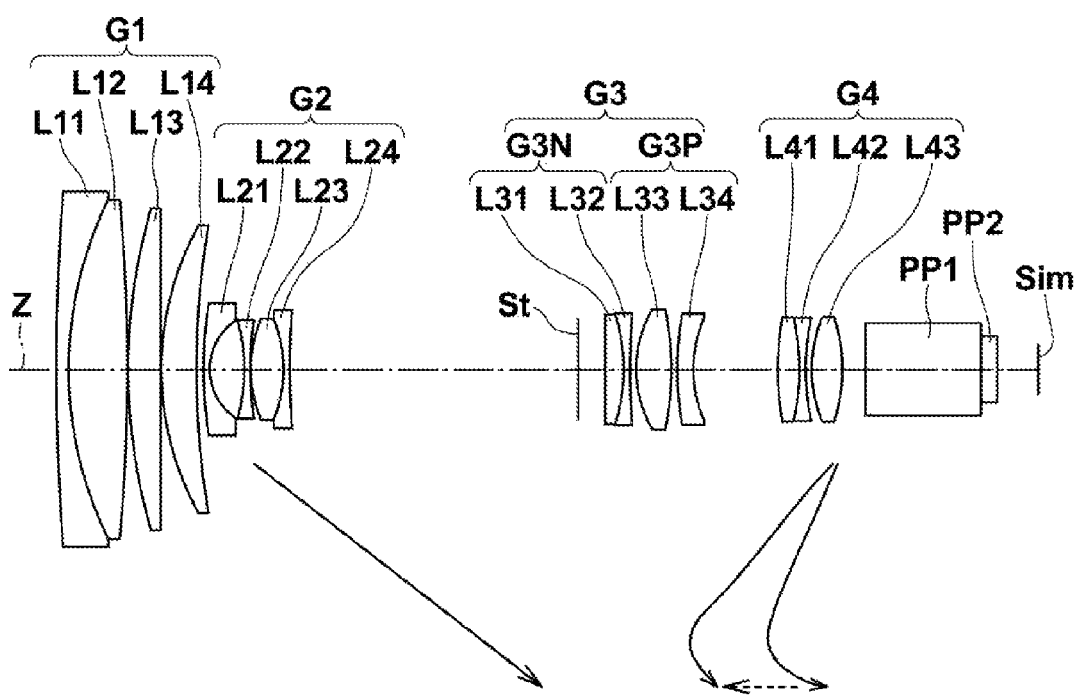

EXAMPLE 5

EXAMPLE 1
FIG.6
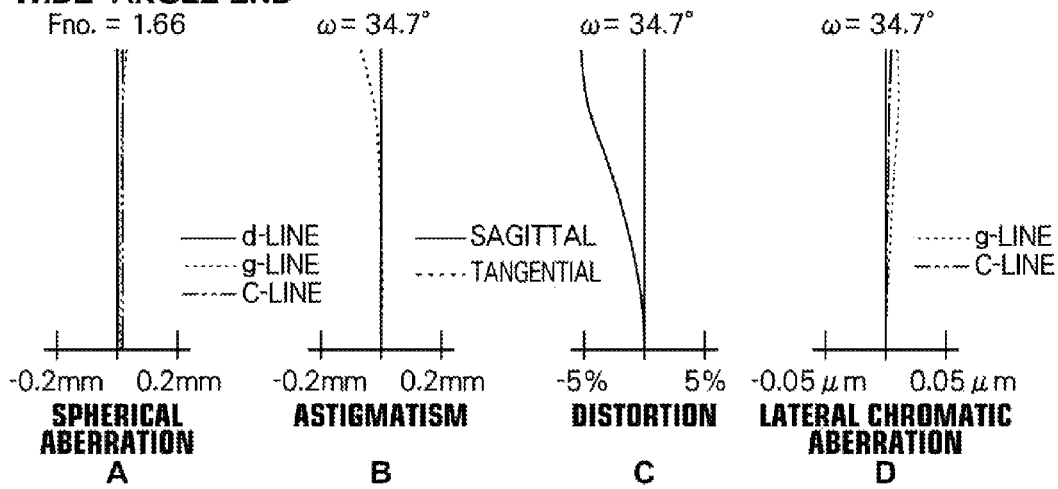
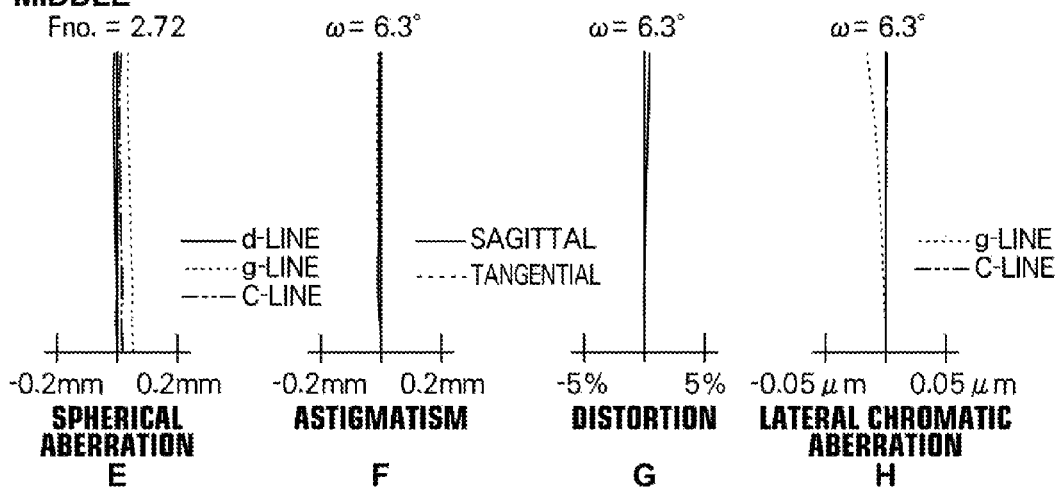
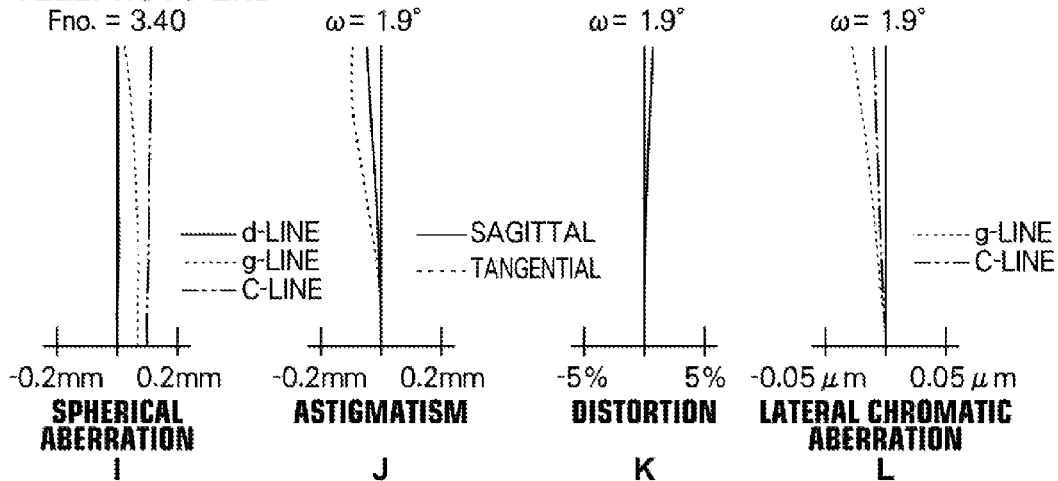

FIG.7
EXAMPLE 2
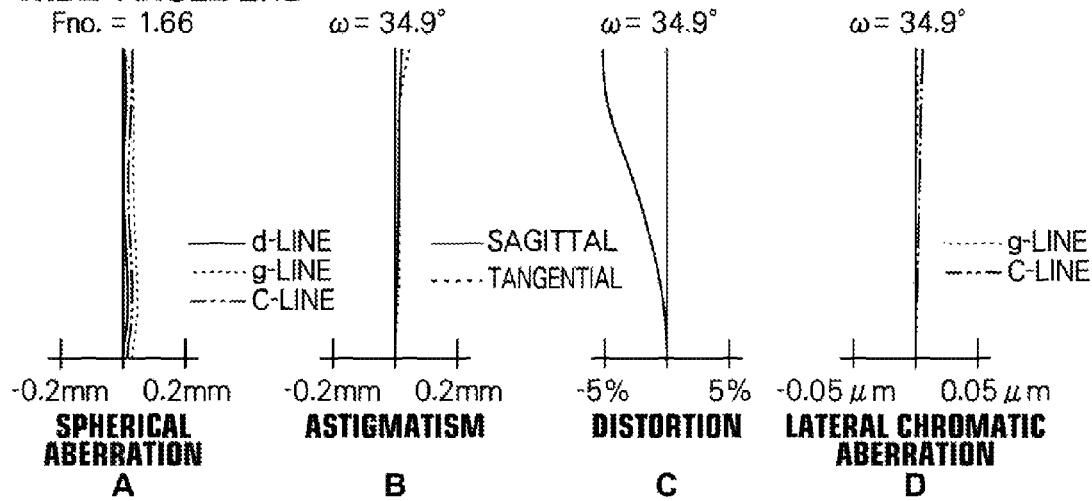
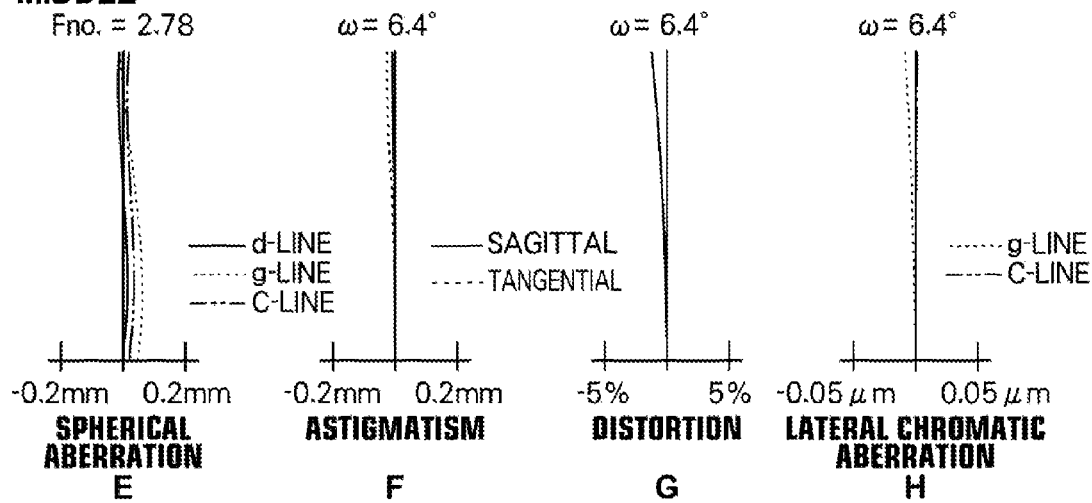
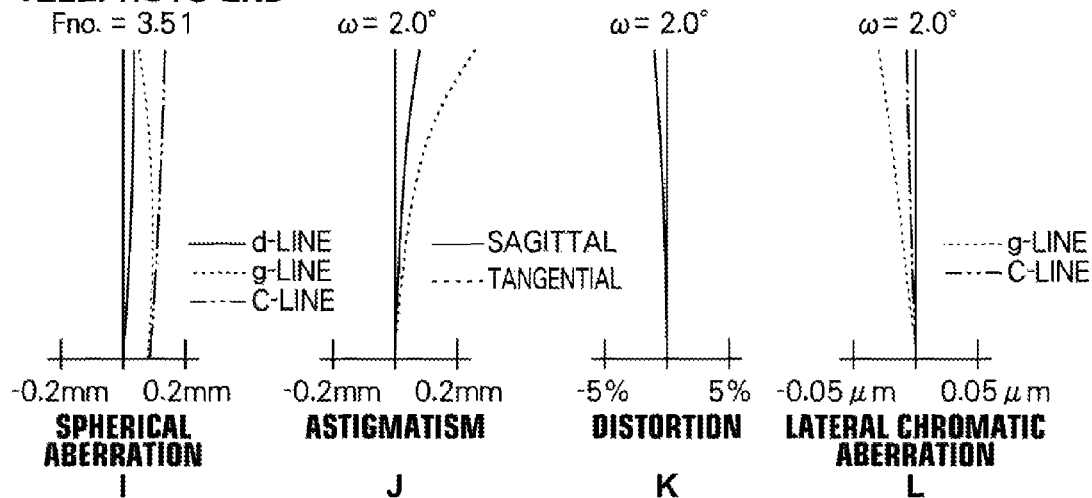

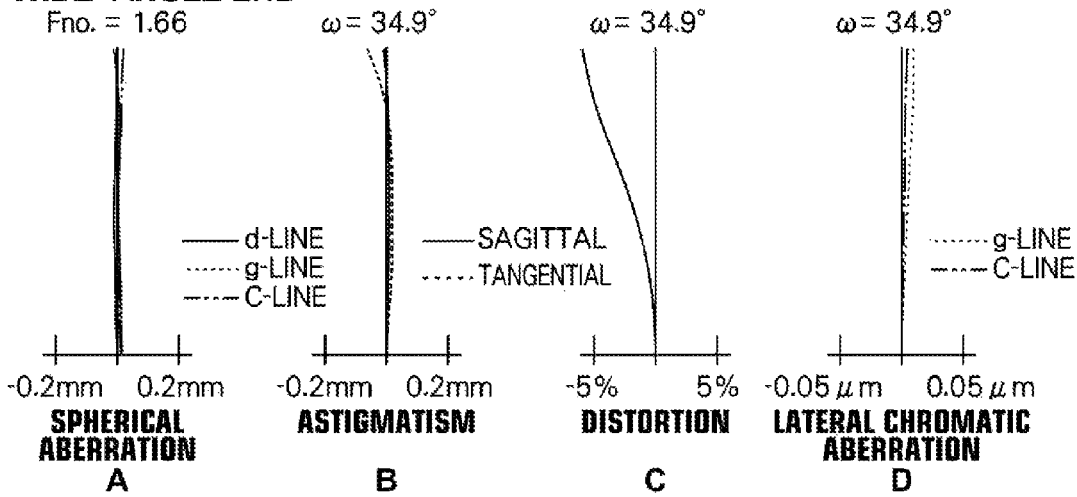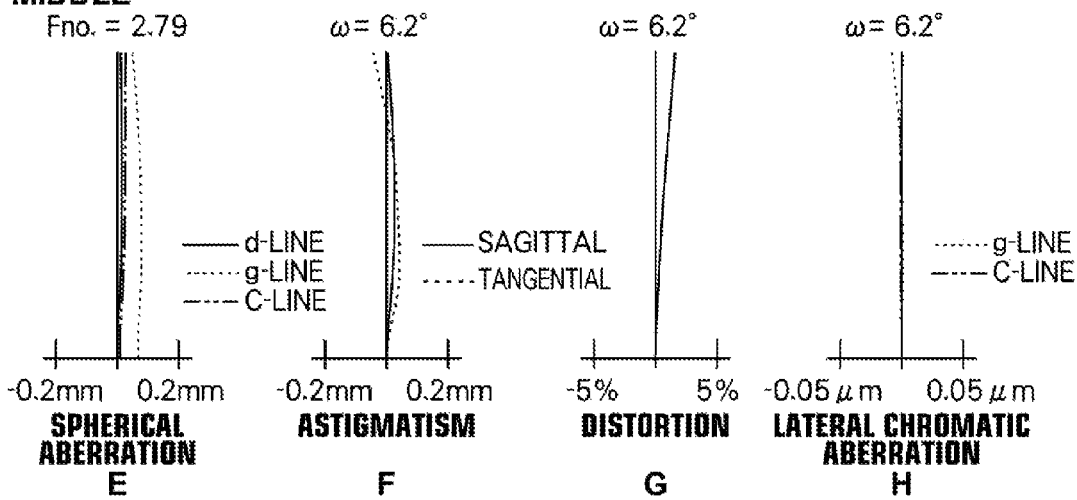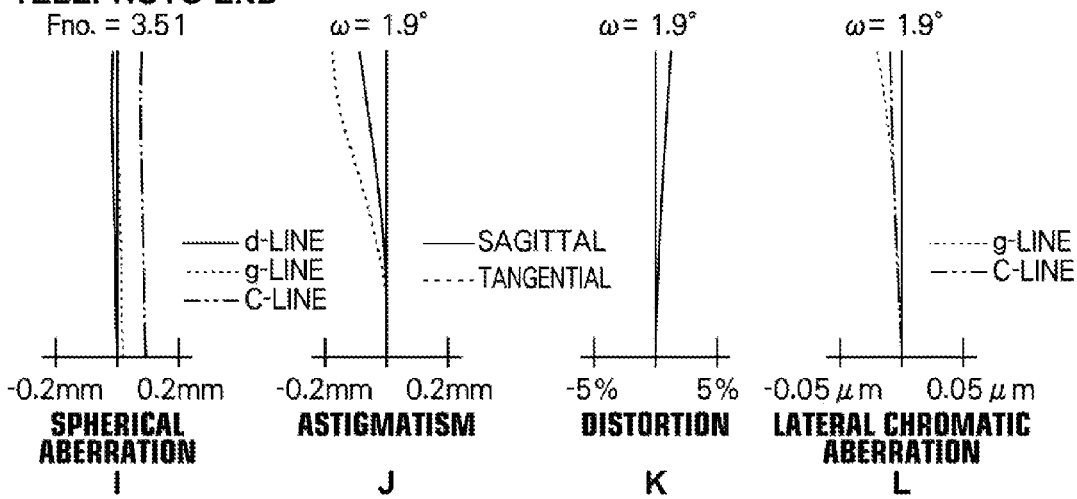
FIG.8 — EXAMPLE 3

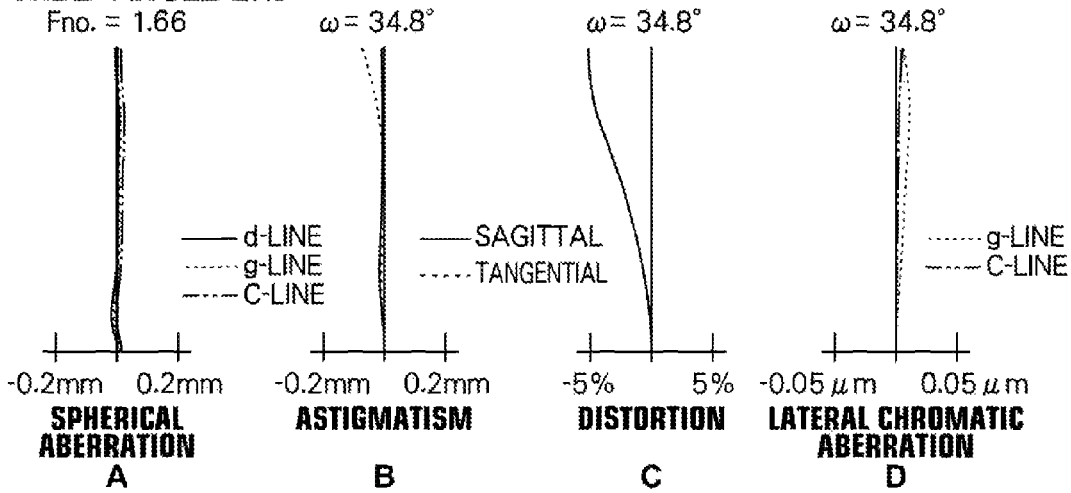
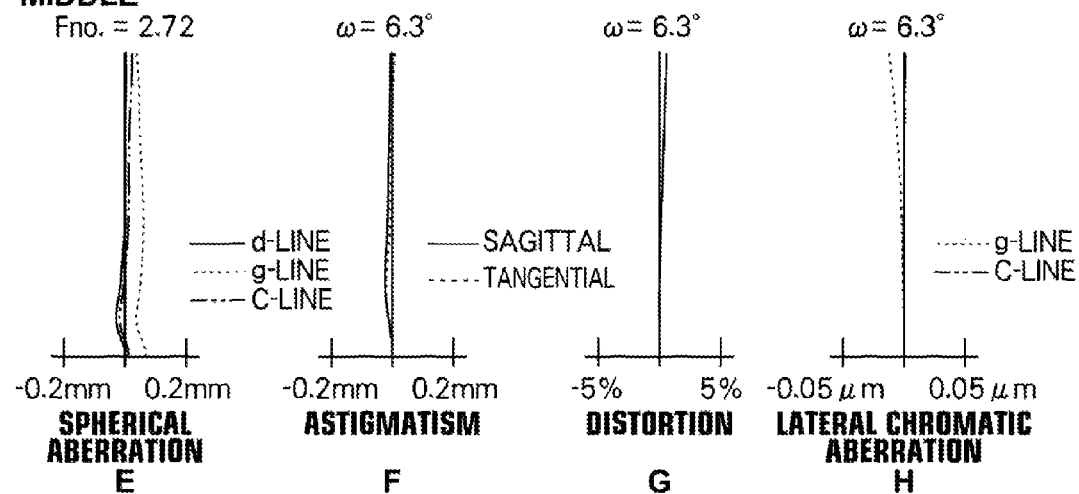
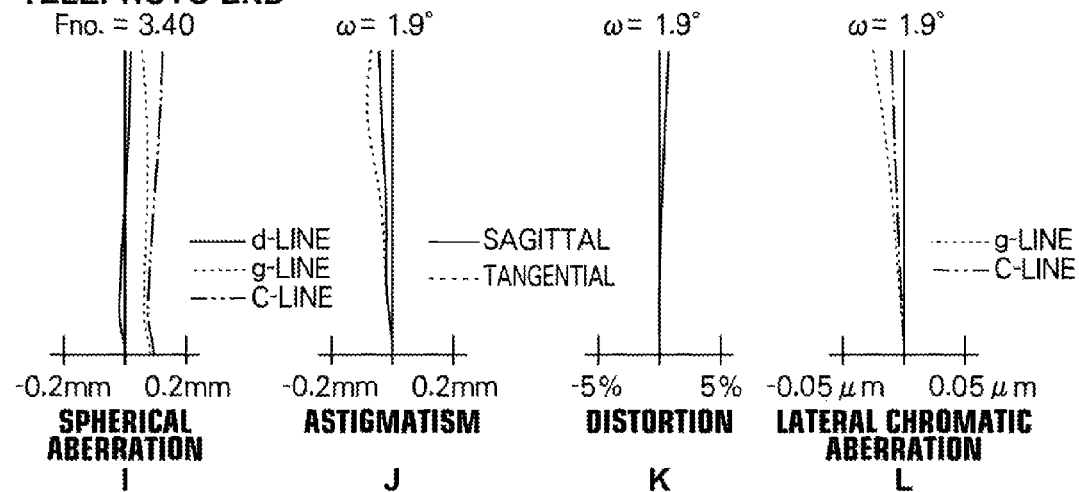
FIG.9 — EXAMPLE 4

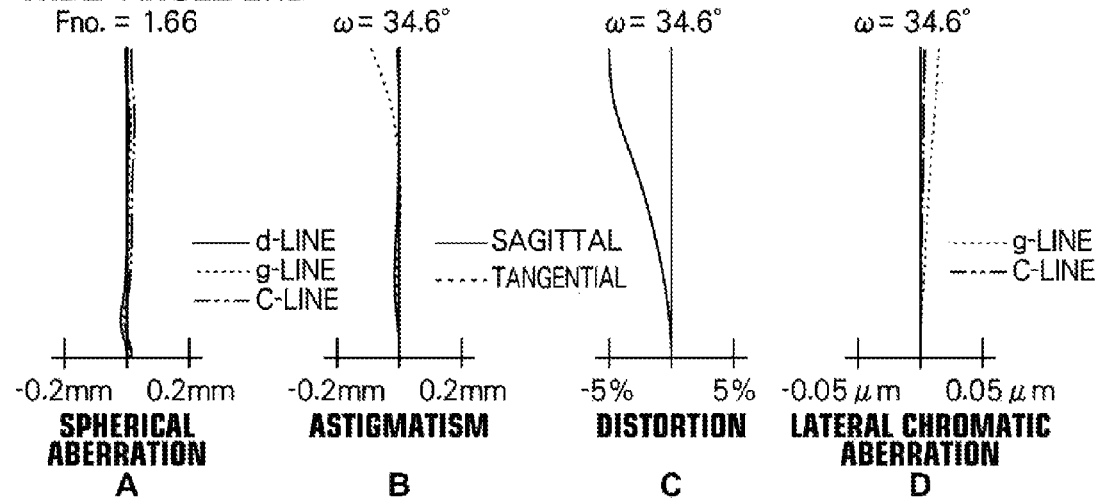
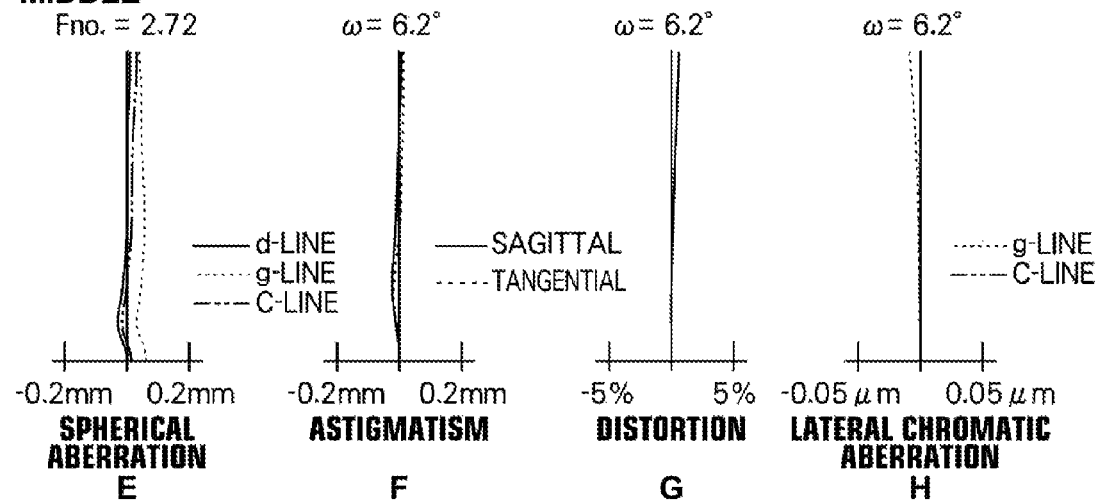
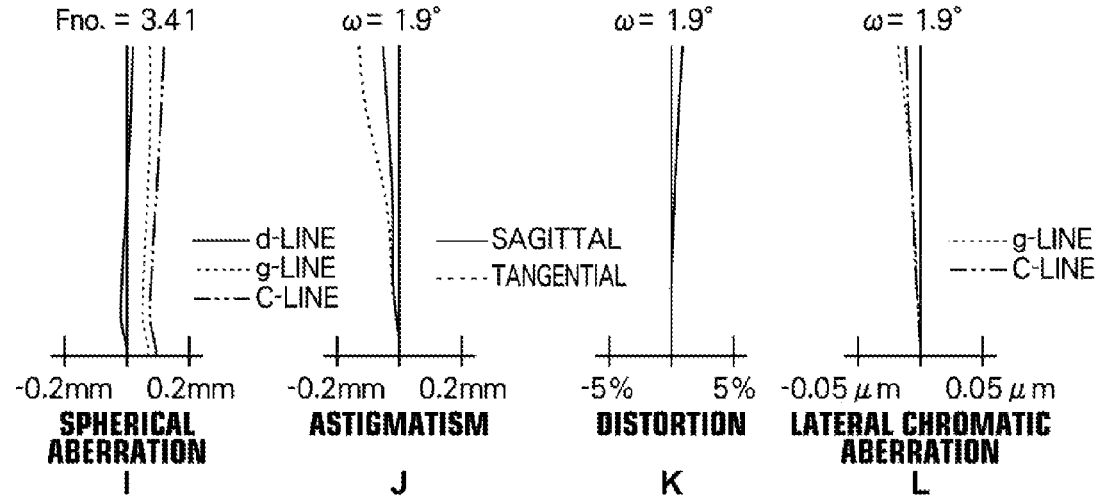
FIG.10 — EXAMPLE 5

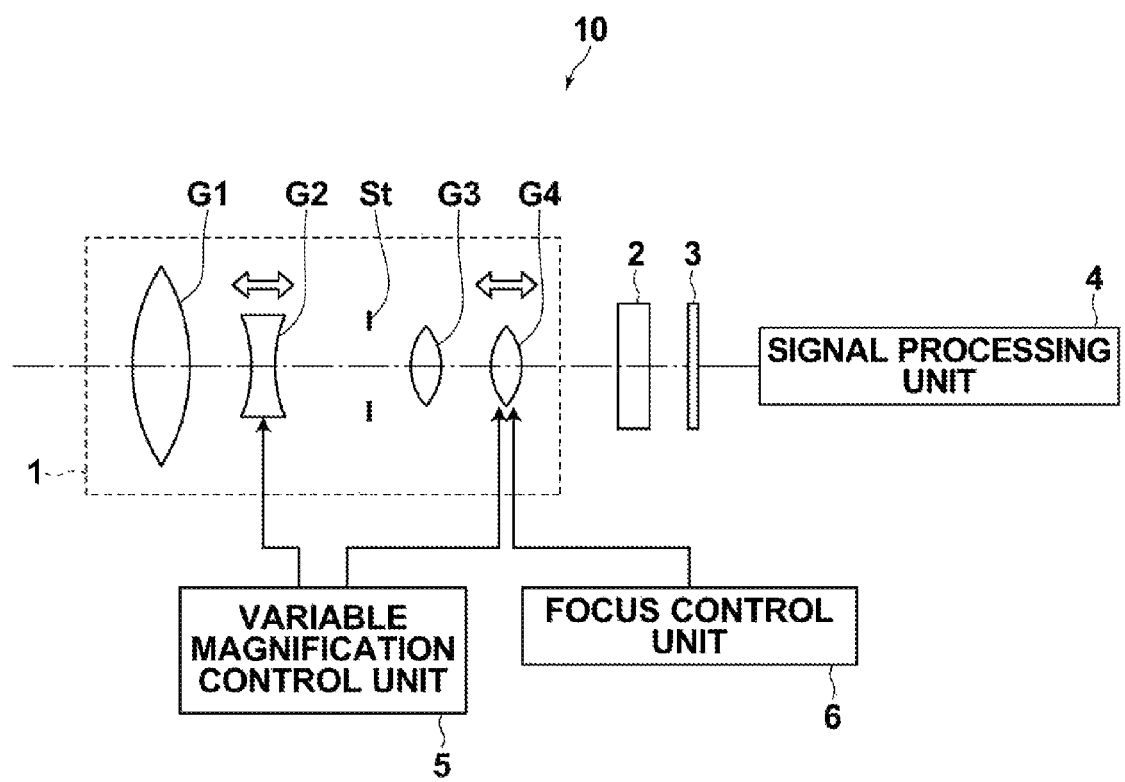

ZOOM LENS AND IMAGING APPARATUS

CROSS REFERENCE TO RELATED APPLICATIONS

This application is a Bypass continuation of PCT/JP2012/002352 filed on Apr. 4, 2012, which claims foreign priority to Japanese Application No. 2011-083286 filed on Apr. 5, 2011. The entire contents of each of the above applications are hereby incorporated by reference.

BACKGROUND OF THE INVENTION

1. Field of the Invention

The present invention relates to a zoom lens and an imaging apparatus, and particularly to a zoom lens appropriate for a video camera, a camera for broadcasting, a surveillance camera and the like, and an imaging apparatus including the zoom lens.

2. Description of the Related Art

Conventionally, as a zoom lens usable in the aforementioned fields, a four-group lens system, in which a positive first lens group, a negative second lens group, a positive third lens group and a positive fourth lens group are arranged in this order from an object side, is known. For example, Japanese Unexamined Patent Publication No. 2006-047771 (Patent Document 1), U.S. Pat. No. 7,227,699 (Patent Document 2) and Japanese Unexamined Patent Publication No. 2007-127694 (Patent Document 3) disclose a four-group zoom lens, in which a first lens group and a third lens group are fixed and a second lens group and a fourth lens group move when the magnification of the zoom lens is changed from wide angle end to telephoto end. The four-group zoom lens is a rear-focus type lens system, in which focusing is performed by the fourth lens group. The lens systems disclosed in Patent Documents 1 through 3 are structured so that a blur in an image to be imaged is corrected by moving a part of an optical system in the third lens group in such a manner to have a component perpendicular to an optical axis.

SUMMARY OF THE INVENTION

In recent years, an electronic imaging apparatus is generally used as an imaging apparatus. In the electronic imaging apparatus, a lens system and an imaging device, such as a CCD (Charge Coupled Device), which images an image formed by the lens system and outputs an electrical signal, are combined. As the resolution of the imaging device has become high, and the size of the imaging device has become small, the zoom lens mounted on the electronic imaging apparatus needs to have high performance, small size and a high variable magnification ratio. Further, reduction in cost is strongly needed.

Meanwhile, the size of the whole zoom lens disclosed in Patent Document 1 is small, but the variable magnification ratio of the zoom lens is about 11 to 12, which does not sufficiently meet a need in recent years for a high variable magnification ratio. The variable magnification ratio of the zoom lens disclosed in Patent Document 2 is about 20, which is considered as a high variable magnification ratio, but the size of the zoom lens is not considered to be small. The zoom lens disclosed in Patent Document 3 has a high variable magnification ratio, and the size is small. However, since the cost of the material used for the zoom lens is high, the zoom lens has a disadvantage in cost.

In view of the foregoing circumstances, it is an object of the present invention to provide a zoom lens having high performance and a high variable magnification ratio, and the size of which is small, and the cost of which is low, and which can obtain an excellent image, and also an imaging apparatus including the zoom lens.

A first zoom lens of the present invention is a zoom lens consisting of:
a first lens group having positive refractive power;
a second lens group having negative refractive power;
a third lens group having positive refractive power; and
a fourth lens group having positive refractive power, which are arranged in this order from an object side,
wherein the first lens group and the third lens group are fixed relative to an image plane with respect to an optical axis direction, and the second lens group moves, along an optical axis, toward an image side, and the fourth lens group moves in the optical axis direction when the magnification of the zoom lens is changed from wide angle end to telephoto end, and
wherein the first lens group consists of a first lens having negative refractive power, a second lens having positive refractive power, and which is cemented to the first lens, a third lens having positive refractive power and a fourth lens having positive refractive power, which are in this order from the object side, and
wherein the third lens group consists of a negative partial lens group having negative refractive power, and which includes a cemented lens, and a positive partial lens group having positive refractive power, which are in this order from the object side, and
wherein a most image-side lens in the positive partial lens group is a negative meniscus lens having a concave surface directed toward the image side.

A second zoom lens of the present invention is a zoom lens consisting of:
a first lens group having positive refractive power;
a second lens group having negative refractive power;
a third lens group having positive refractive power; and
a fourth lens group having positive refractive power, which are arranged in this order from an object side,
wherein the first lens group and the third lens group are fixed relative to an image plane with respect to an optical axis direction, and the second lens group moves, along an optical axis, toward an image side, and the fourth lens group moves in the optical axis direction when the magnification of the zoom lens is changed from wide angle end to telephoto end, and
wherein the first lens group consists of a first lens having negative refractive power, a second lens having positive refractive power, and which is cemented to the first lens, a third lens having positive refractive power and a fourth lens having positive refractive power, which are in this order from the object side, and
wherein the third lens group consists of a negative partial lens group having negative refractive power, and which includes a cemented lens, and a positive partial lens group having positive refractive power, which are in this order from the object side, and
wherein the following formula (1) is satisfied:

$$0.2 < f3P/|f3N| < 0.35 \tag{1},$$

where
f3P: a focal length of the positive partial lens group, and
f3N: a focal length of the negative partial lens group.

A third zoom lens of the present invention is a zoom lens consisting of:
a first lens group having positive refractive power;
a second lens group having negative refractive power;
a third lens group having positive refractive power; and a fourth lens group having positive refractive power, which are arranged in this order from an object side, wherein the first lens group and the third lens group are fixed relative to an image plane with respect to an optical axis direction, and the second lens group moves, along an optical axis, toward an image side, and the fourth lens group moves in the optical axis direction when the magnification of the zoom lens is changed from wide angle end to telephoto end, and wherein the first lens group consists of a first lens having negative refractive power, a second lens having positive refractive power, and which is cemented to the first lens, a third lens having positive refractive power and a fourth lens having positive refractive power, which are in this order from the object side, and wherein the third lens group consists of a negative partial lens group having negative refractive power, and which includes a cemented lens, and a positive partial lens group having positive refractive power, which are in this order from the object side, and wherein the following formula (2) is satisfied:

$$60.0 < v1p < 70.0 \tag{2}$$

where v1p: an average of Abbe numbers of the lenses having positive refractive power in the first lens group for d-line.

A fourth zoom lens of the present invention is a zoom lens consisting of:

a first lens group having positive refractive power;
a second lens group having negative refractive power;
a third lens group having positive refractive power; and
a fourth lens group having positive refractive power, which are arranged in this order from an object side, wherein the first lens group and the third lens group are fixed relative to an image plane with respect to an optical axis direction, and the second lens group moves, along an optical axis, toward an image side, and the fourth lens group moves in the optical axis direction when the magnification of the zoom lens is changed from wide angle end to telephoto end, and wherein the first lens group consists of a first lens having negative refractive power, a second lens having positive refractive power, and which is cemented to the first lens, a third lens having positive refractive power and a fourth lens having positive refractive power, which are in this order from the object side, and wherein the third lens group consists of a negative partial lens group having negative refractive power, and which includes a cemented lens, and a positive partial lens group having positive refractive power, which are in this order from the object side, and wherein the following formula (3) is satisfied:

$$0.560 < f3P/fG1 < 0.637 \tag{3}$$

where f3P: a focal length of the positive partial lens group, and
fG1: a focal length of the first lens group.

In the first through fourth zoom lenses of the present invention, it is desirable that displacement of an image when the zoom lens has vibrated is corrected by moving the positive partial lens group in a direction perpendicular to the optical axis.

In the first through fourth zoom lenses of the present invention, it is desirable that the following formula (4) is satisfied:

$$2.0 \leq |f3N|/fG3 < 7.5 \tag{4}$$

where f3N: a focal length of the negative partial lens group, and
fG3: a focal length of the third lens group.

In the first through fourth zoom lenses of the present invention, it is desirable that the following formula (5) is satisfied:

$$3.6 < |f3N|/fG4 < 10.0 \tag{5}$$

where f3N: a focal length of the negative partial lens group, and
fG4: a focal length of the fourth lens group.

In the first through fourth zoom lenses of the present invention, it is desirable that the following formula (6) is satisfied:

$$18.0 < |f3N|/fw < 60.0 \tag{6}$$

where f3N: a focal length of the negative partial lens group, and
fw: a focal length of an entire system at wide angle end.

In the first through fourth zoom lenses of the present invention, the positive partial lens group may include a cemented lens.

Here, the term "lens group" does not necessarily mean a lens group consisting of plural lenses, but also means a lens group consisting of only one lens. Further, the phrase "consisting of" is used to mean substantially consisting of. Therefore, a lens having substantially no power, an optical element, such as a stop, a cover glass and a filter, which is not a lens, a lens flange, a lens barrel, an imaging device, a mechanism, such as a hand-shake blur correction mechanism, and the like may be included in addition to the listed composition elements.

In the zoom lens of the present invention, the sign of the shape of a lens surface and the sign of refractive power are considered in a paraxial region when a lens has an aspheric surface.

An imaging apparatus of the present invention is an imaging apparatus comprising:

anyone of the first through fourth zoom lenses of the present invention; and an imaging device that images an optical image formed by the zoom lens, and outputs an electrical signal.

The first zoom lens of the present invention includes a positive first lens group, a negative second lens group, a positive third lens group, and a positive fourth lens group, which are arranged in this order from the object side, and the second lens group and the fourth lens group move in an optical axis direction when the magnification of the zoom lens is changed. In the zoom lens, the lens structure of the first lens group is appropriately set. Further, the third lens group consists of a negative lens group including a cemented lens and a positive lens group in this order from the object side, and the structure of the most image-side lens in the positive lens group is appropriately set. Therefore, it is possible to achieve high performance, a high variable magnification ratio, a small size and a low cost, and to obtain an excellent image.

The second zoom lens of the present invention includes a positive first lens group, a negative second lens group, a positive third lens group, and a positive fourth lens group, which are arranged in this order from the object side, and the second lens group and the fourth lens group move in an optical axis direction when the magnification of the zoom lens is changed. In the zoom lens, the lens structure of the first lens group is appropriately set. Further, the third lens group consists of a negative lens group including a cemented lens and a positive lens group in this order from the object side, and the magnitude of the refractive power of the negative lens group and that of the positive lens group are appropriately set to satisfy the formula (1). Therefore, it is possible to achieve high performance, a high variable magnification ratio, a small size and a low cost, and to obtain an excellent image.

The third zoom lens of the present invention includes a positive first lens group, a negative second lens group, a positive third lens group, and a positive fourth lens group, which are arranged in this order from the object side, and the second lens group and the fourth lens group move in an optical axis direction when the magnification of the zoom lens is changed. In the zoom lens, the lens structure of the first lens group is appropriately set. Especially, the material of positive lenses in the first lens group is appropriately selected so as to satisfy the formula (2). Further, the third lens group consists of a negative lens group including a cemented lens and a positive lens group in this order from the object side. Therefore, it is possible to achieve high performance, a high variable magnification ratio, a small size and a low cost, and to obtain an excellent image.

The fourth zoom lens of the present invention includes a positive first lens group, a negative second lens group, a positive third lens group, and a positive fourth lens group, which are arranged in this order from the object side, and the second lens group and the fourth lens group move in the optical axis direction when the magnification of the zoom lens is changed. In the zoom lens, the lens structure of the first lens group is appropriately set. Further, the third lens group consists of a negative lens group including a cemented lens and a positive lens group in this order from the object side, and the magnitude of the refractive power of the positive lens group and that of the first lens group are appropriately set to satisfy the formula (3). Therefore, it is possible to achieve high performance, a high variable magnification ratio, a small size and a low cost, and to obtain an excellent image.

The imaging apparatus of the present invention includes the zoom lens of the present invention. Therefore, the imaging apparatus is structurable in small size and at low cost. Further, it is possible to obtain high quality images at high variable magnification ratios.

BRIEF DESCRIPTION OF THE DRAWINGS

FIG. 3 is a cross section illustrating the lens structure of a zoom lens in Example 3 of the present invention;

FIG. 4 is a cross section illustrating the lens structure of a zoom lens in Example 4 of the present invention;

FIG. 6, Sections A through L are aberration diagrams of the zoom lens in Example 1 of the present invention;

FIG. 7, Sections A through L are aberration diagrams of the zoom lens in Example 2 of the present invention;

FIG. 8, Sections A through L are aberration diagrams of the zoom lens in Example 3 of the present invention;

FIG. 9, Sections A through L are aberration diagrams of the zoom lens in Example 4 of the present invention;

FIG. 10, Sections A through L are aberration diagrams of the zoom lens in Example 5 of the present invention; and FIG. 11 is a schematic diagram illustrating the configuration of an imaging apparatus according to an embodiment of the present invention.

DESCRIPTION OF THE PREFERRED EMBODIMENTS

Figure 1:
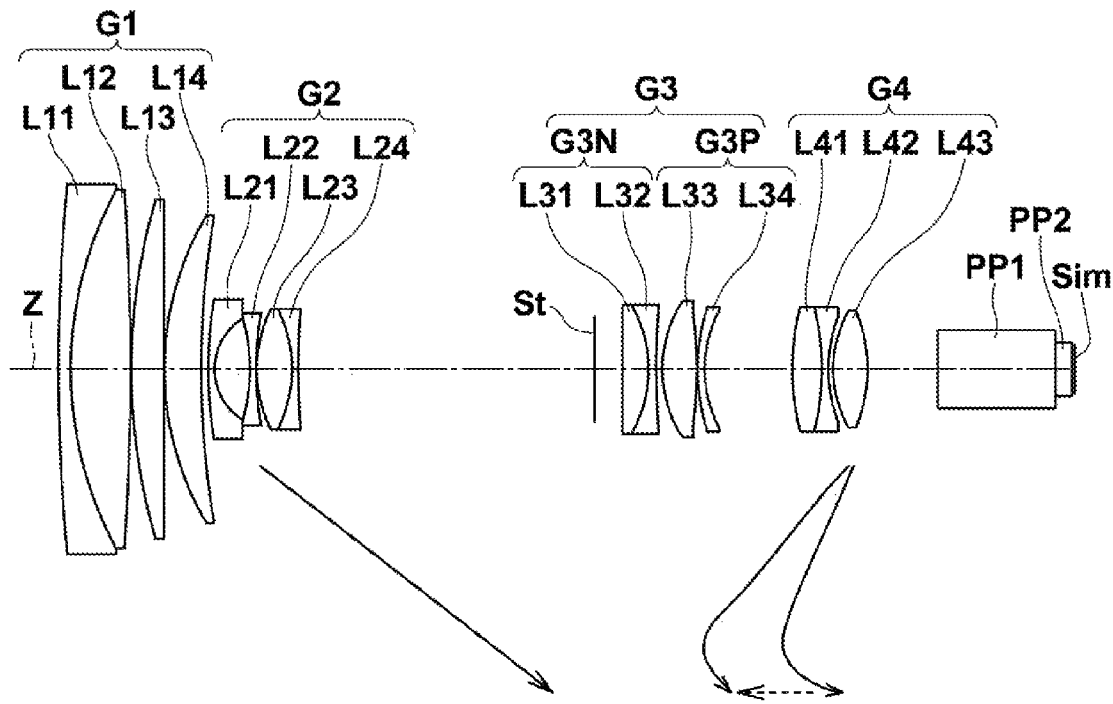
FIG. 1 is a cross section illustrating the lens structure of a zoom lens in Example 1 of the present invention.

Hereinafter, embodiments of the present invention will be described in detail with reference to drawings. FIG. 1 is a cross section illustrating an example of the structure of a zoom lens according to an embodiment of the present invention, and corresponds to a zoom lens of Example 1, which will be described later. FIG. 2 through FIG. 5 are cross sections illustrating other examples of the structure of a zoom lens according to an embodiment of the present invention, and correspond to zoom lenses of Examples 2 through 5 respectively, which will be described later. In the examples illustrated in FIG. 1 through FIG. 5, the basic structure is similar, and illustration methods are also similar. Therefore, a zoom lens according to an embodiment of the present invention will be described mainly with reference to FIG. 1.

In FIG. 1, the left side is an object side, and the right side is an image side. In a zoom lens according to an embodiment of the present invention, first lens group G1 having positive refractive power, second lens group G2 having negative refractive power, third lens group G3 having positive refractive power, and fourth lens group G4 having positive refractive power are arranged, as lens groups, in this order from an object side.

FIG. 1 illustrates an example, in which parallel-flat-plate-shaped optical members PP1, PP2 are arranged between fourth lens group G4 and image plane Sim. In recent years, some imaging apparatuses adopt a 3CCD method, which uses a CCD for each color, to improve image qualities. A color separation optical system, such as a color separation prism, is inserted between a lens system and image plane Sim to cope with the 3CCD method. Further, when a zoom lens is applied to an imaging apparatus, it is desirable that a cover glass, various filters, such as an infrared-ray-cut filter and a low-pass filter, and the like are arranged between the optical system and image plane Sim based on the structure of a camera on which the lens is mounted. Optical members PP1, PP2 assume such a color separation optical system, a cover glass, various filters and the like.

This zoom lens is structured in such a manner that first lens group G1 and third lens group G3 are fixed relative to image plane Sim with respect to an optical axis direction, and second lens group G2 moves, along optical axis Z, toward an image side, and fourth lens group G4 moves in the optical axis direction when the magnification of the zoom lens is changed from wide angle end to telephoto end. In the example illustrated in FIG. 1, aperture stop St is fixed during magnification change. In FIG. 1, arrows in solid lines under second lens group G2 and fourth lens group G4 schematically illustrate paths of movement of second lens group G2 and fourth lens group G4, respectively, when magnification is changed from wide angle end to telephoto end.

The zoom lens in the embodiment of the present invention adopts a rear focus method, and fourth lens group G4 has a function as a focus group for correcting a fluctuation of an image plane when magnification is changed or when a distance to an object fluctuates. An object-side arrow of the two solid-line arrows under fourth lens group G4 schematically illustrates the path of movement of fourth lens group G4 when the zoom lens is focused on an object at short distance, and an image-side arrow of the two solid-line arrows schematically illustrates the path of movement of fourth lens group G4 when the zoom lens is focused on an object at infinity. When focus is adjusted from an object at infinity to an object at short distance at telephoto end, fourth lens group G4 moves toward the object side, as indicated by a broken-line arrow illustrated at the heads of the two solid-line arrows.

In the example illustrated in FIG. 1, aperture stop St is arranged between second lens group G2 and third lens group G3. In the zoom lens of the embodiment of the present invention, a positive lens group, a negative lens group, a positive lens group and a positive lens group are arranged in this order from the object side. Further, second lens group G2 and fourth lens group G4 move, and first lens group G1 and third lens group G3 are fixed when magnification is changed. In such a type of zoom lens, it is desirable that aperture stop St is arranged at a middle of the lens system or in the vicinity of the middle of the lens system, as in the example illustrated in FIG. 1. In other words, it is desirable that aperture stop St is arranged on the object side of third lens group G3 to reduce the size of the zoom lens in the diameter direction. In FIG. 1, aperture stop St does not necessarily represent the size nor the shape of aperture stop St, but represents a position on optical axis Z.

First lens group G1 consists of first lens L11 having negative refractive power, second lens L12 having positive refractive power, and which is cemented to first lens L11, third lens L13 having positive refractive power and fourth lens L14 having positive refractive power, which are in this order from the object side. When a zoom lens having high performance and a high variable magnification ratio is tried to be achieved, first lens group G1 is likely to need four or more lenses including three or more positive lenses. When first lens group G1 has three-group four-element structure consisting of lenses L11 through L14, as described above, it is possible to achieve high performance and a high variable magnification ratio while the size and the cost are reduced by minimizing the number of lenses.

For example, second lens group G2 may consist of negative meniscus lens L21, double-concave lens L22, double-convex lens L23, and lens L24 having negative refractive power, and which is cemented to lens L23, which are in this order from the object side, as illustrated in the example of FIG. 1. When second lens group G2, which is mainly in charge of a variable magnification function, has three-group four-element structure, as described above, it is possible to easily achieve high performance and a high variable magnification ratio while the zoom lens is structured in small size.

Third lens group G3 consists of negative partial lens group G3N having negative refractive power, and which includes a cemented lens, and positive partial lens group G3P having positive refractive power, which are in this order from the object side. Positive partial lens group G3P may be moved in a direction perpendicular to optical axis Z, and used as a lens group for anti-vibration.

In an optical system having a high variable magnification ratio, and which is a target zoom lens of the embodiment of the present invention, a vibration of an image tends to be large even by slight hand shake. Therefore, it is desirable that the zoom lens has an anti-vibration function. Hence, it is desirable that the zoom lens is structured in such a manner that positive partial lens group G3P is moved in a direction perpendicular to optical axis Z to correct a displacement of an image when the zoom lens has vibrated. When anti-vibration is performed in this manner by eccentrically moving, in a direction perpendicular to optical axis Z, a part of a lens system for imaging, an additional optical system specialized in anti-vibration is not needed.

In a lens system for a 3CCD method using three imaging devices, a long back focus for inserting a color separation optical system is needed, compared with a lens system for a 1CCD method using only one imaging device. Generally, in such a type of optical system as the zoom lens in the embodiment of the present invention, the refractive power of third lens group G3 becomes weak, and the sensitivity of eccentricity of third lens group G3 in the direction perpendicular to the optical axis becomes small to obtain a long back focus. If the entire third lens group G3 is eccentrically moved in the direction perpendicular to the optical axis to perform anti-vibration, the movement amount of third lens group G3 becomes large, and the effective apertures of lenses in third lens group G3 become large. Consequently, the size of the lens system and the size of the apparatus become large.

Therefore, third lens group G3 is divided into negative partial lens group G3N and positive partial lens group G3P. Then, strong positive refractive power is given to positive partial lens group G3P, and only positive partial lens group G3P is eccentrically moved in a direction perpendicular to the optical axis to perform anti-vibration. Then, it is possible to suppress the movement amount of positive partial lens group G3P and the sizes of the lens system and the apparatus. Further, if the refractive power of negative partial lens group G3N is appropriately set so as to cancel a part of the strong positive refractive power of positive partial lens group G3P, it is possible to obtain a long back focus.

Further, the arrangement of negative partial lens group G3N and positive partial lens group G3P from the object side in third lens group G3 can also contribute to a long back focus, because negative partial lens group G3N can immediately guide light output from negative second lens group G2 toward directions away from the optical axis.

If positive partial lens group G3P is used as a lens group for anti-vibration, a space for a drive mechanism for driving positive partial lens group G3P is needed. Therefore, it is desirable that positive partial lens group G3P is located away from aperture stop St. Since aperture stop St tends to be arranged on the object side of third lens group G3, as described above, it is desirable that positive partial lens group G3P is located on the image side in third lens group G3. Therefore, the aforementioned arrangement in third lens group G3 is appropriate also for this reason.

It is desirable that the cemented lens included in negative partial lens group G3N consists of a positive lens and a negative lens cemented together. This can contribute to an excellent balance of correction of chromatic aberrations and a reduction in size. For example, negative partial lens group G3N may consist of only a cemented lens of lens L31 having positive refractive power and lens L32 having negative refractive power, which are arranged in this order from the object side and cemented together, as illustrated in FIG. 1. When the number of lenses is minimized in this manner, it is possible to reduce the size and the cost.

Lens L31 may be a plano-convex lens, or a double-convex lens. It is desirable that lens L32 is a double-concave lens so that negative refractive power necessary for negative partial lens group G3N is secured.

It is desirable that the most image-side lens in positive partial lens group G3P is a meniscus lens having a negative refractive power and having a concave surface directed toward the image side. Arrangement of a lens having such a shape on the most image-side in positive partial lens group G3P having positive refractive power is advantageous to correction of a lateral chromatic aberration, and it is possible to obtain a high resolution. Further, it is desirable that the negative meniscus lens is a simple lens, which is not a cemented lens, for the purpose of correction of aberrations.

It is desirable that positive partial lens group G3P includes at least one negative lens. When the positive partial lens group has a negative lens or lenses, it is possible to reduce the amount of aberrations generated by positive partial lens group G3P alone. Therefore, when positive partial lens group G3P is used as a lens group for anti-vibration, and eccentrically moved in the direction perpendicular to optical axis Z, it is possible to easily correct a fluctuation of various aberrations generated by the eccentric movement.

Positive partial lens group G3P may adopt two-group two-element structure in which two simple lenses, i.e., double-convex lens L33 and meniscus lens having a negative refractive power L34 are arranged in this order from the object side, for example, as illustrated in FIG. 1. This structure can suppress the number of lenses, and reduce the size and the cost. Further, when positive partial lens group G3P is used as a lens group for anti-vibration, it is possible to reduce the size and the weight by minimizing the number of lenses in this manner. Further, it is possible to suppress a load on a drive system.

Alternatively, positive partial lens group G3P may include a cemented lens, and that is advantageous to excellent correction of chromatic aberrations. When positive partial lens group G3P is used as a lens group for anti-vibration, if the positive partial lens group G3P includes a cemented lens, it is possible to reduce a fluctuation of chromatic aberrations generated when the positive partial lens group G3P is eccentrically moved in the direction perpendicular to optical axis Z.

Figure 2:
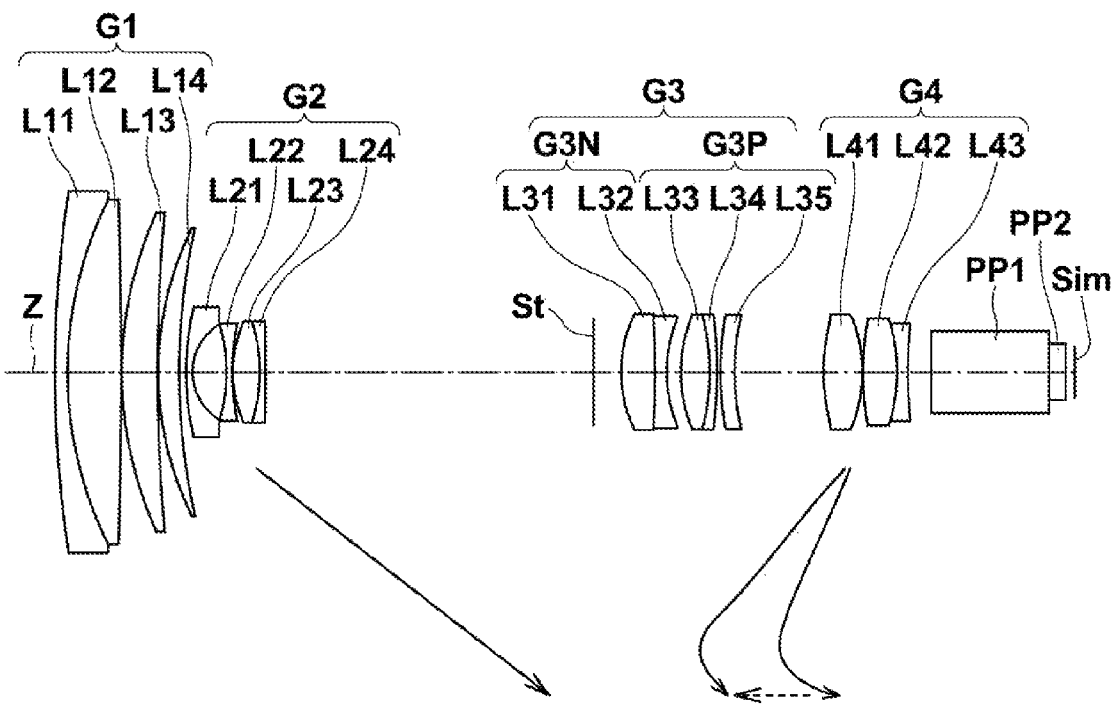
FIG. 2 is a cross section illustrating the lens structure of a zoom lens in Example 2 of the present invention.
Figure 5:
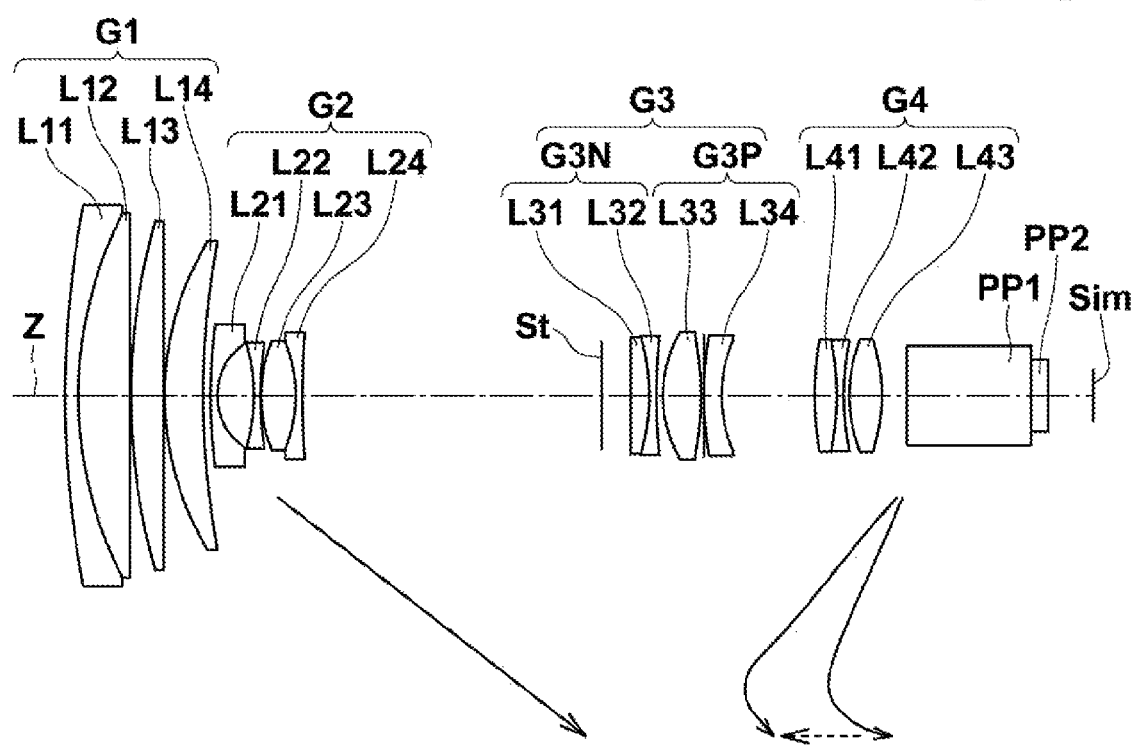
FIG. 5 is a cross section illustrating the lens structure of a zoom lens in Example 5 of the present invention.

When positive partial lens group G3P includes a cemented lens, the positive partial lens group G3P may adopt two-group three-element structure, for example, as illustrated in FIG. 2. The structure may consist of double-convex lens L33, negative meniscus lens L34 that is cemented to lens L33, and negative meniscus lens L35, which is a simple lens, in this order from the object side.

It is desirable that positive partial lens group G3P includes at least an aspheric surface. That makes excellent correction of aberrations possible. When positive partial lens group G3P is used as a lens group for anti-vibration, if an aspheric surface or surfaces are included in positive partial lens group G3P, excellent correction of eccentric aberrations generated in anti-vibration becomes easy.

When positive partial lens group G3P has two-group two-element structure, as described above, it is desirable that the double convex lens on the object side is an aspheric lens. That is advantageous to excellent correction of a spherical aberration. When positive partial lens group G3P has two-group three-element structure, as described above, it is desirable that negative meniscus lens on the most image side is an aspheric lens. That is advantageous to excellent correction of curvature of field.

Fourth lens group G4 may have, for example, three element structure consisting of two lenses having positive refractive power and a lens having negative refractive power. For example, in the example illustrated in FIG. 1, fourth lens group G4 consists of positive lens L41, negative lens L42 and positive lens L43 in this order from the object side.

Further, it is desirable that the zoom lens according to the embodiment of the present invention appropriately satisfies the following formulas (1) through (6). As a desirable mode, one of the following formulas may be satisfied. Alternatively, plural formulas in combination may be satisfied.

$$0.2 < f3P/|f3N| < 0.35 \quad (1)$$

$$60.0 < \nu 1p < 70.0 \quad (2)$$

$$0.560 < f3P/fG1 < 0.637 \quad (3)$$

$$2.0 \leq |f3N|/fG3 < 7.5 \quad (4)$$

$$3.6 < |f3N|/fG4 < 10.0 \quad (5)$$

$$18.0 < |f3N|/fw < 60.0 \quad (6),$$

where
f3P: a focal length of positive partial lens group G3P,
f3N: a focal length of negative partial lens group G3N,
ν1p: an average of Abbe numbers of lenses having positive refractive power in first lens group G1 for d-line,
fG1: a focal length of first lens group G1,
fG3: a focal length of third lens group G3,
fG4: a focal length of fourth lens group G4, and
fw: a focal length of an entire system at wide angle end.

Next, the action and the effect of each of the aforementioned formulas will be described. Formula (1) is related to a ratio between the magnitudes of refractive power of negative partial lens group G3N and positive partial lens group G3P, which constitute third lens group G3. When the value exceeds the upper limit of formula (1), an image plane is undercorrected at telephoto end, and the performance deteriorates. Further, when the value exceeds the upper limit of formula (1), the refractive power of positive partial lens group G3P becomes weak. Therefore, when positive partial lens group G3P is used as a lens group for anti-vibration, the movement amount of positive partial lens group G3P becomes large. Consequently, the size of an apparatus becomes large.

When the value is lower than the lower limit of formula (1), curvature of field is insufficiently corrected. Further, the refractive power of negative partial lens group G3N becomes weak, and a back focus becomes short. Therefore, it becomes difficult to secure a space necessary to insert a color separation optical system.

Therefore, it is more desirable that the following formula (1-1) is satisfied instead of formula (1):

$$0.3 < f3P/|f3N| < 0.35 \quad (1\text{-}1).$$

Formula (2) is related to an average of Abbe numbers of positive lenses included in first lens group G1. As described above, first lens group G1 is likely to need four or more lenses including three or more positive lenses to obtain a high-performance zoom lens having a high variable magnification ratio. Further, when even higher performance is needed, a material having anomalous dispersion properties may be used in first lens group G1 to correct chromatic aberrations at telephoto end. However, the cost of such a material is generally high. Further, the effective diameter of first lens group G1 is large, compared with the effective diameters of the other lens groups. Therefore, an influence of the cost on the first lens group G1 is the highest in the entire lens system.

When the value exceeds the upper limit of formula (2), a high-cost material having anomalous dispersion properties is used. Therefore, the cost of the lens system becomes high. In contrast, when the value is lower than the lower limit of formula (2), chromatic aberrations at telephoto end increase, and correction of the chromatic aberrations becomes difficult. Especially, correction of a longitudinal chromatic aberration becomes difficult.

Therefore, it is more desirable that the following formula (2-1) is satisfied instead of formula (2):

$$64.0 < \nu 1p < 69.0 \quad (2\text{-}1).$$

Formula (3) is related to a ratio between the refractive power of positive partial lens group G3P and the refractive power of first lens group G1. When the value exceeds the upper limit of formula (3), a longitudinal chromatic aberration and a lateral chromatic aberration at wide angle end increase, and the performance deteriorates. In contrast, when the value is lower than the lower limit of formula (3), an image plane is undercorrected at wide angle end, and a longitudinal chromatic aberration becomes worse at telephoto end. Therefore, the performance deteriorates.

Hence, it is more desirable that the following formula (3-1) is satisfied instead of formula (3):

$$0.580 < f3P/fG1 < 0.635 \quad (3\text{-}1).$$

Formula (4) is related to allocation of refractive power to negative partial lens group G3N in third lens group G3. When the value exceeds the upper limit of formula (4), the refractive power of negative partial lens group G3N becomes weak, and a back focus becomes short. Therefore, it becomes impossible to secure a space necessary to insert a color separation optical system. In contrast, when the value is lower than the lower limit of formula (4), the negative refractive power of negative partial lens group G3N becomes strong, and a divergence action by the negative partial lens group G3N, which directs rays toward directions away from optical axis Z, becomes strong. Therefore, the effective diameter of positive partial lens group G3P located on the image side of negative partial lens group G3N becomes large. Hence, the weight and the cost increase.

Therefore, it is more desirable that the following formula (4-1) is satisfied instead of formula (4):

$$2.0 \le |f3N|/fG3 < 4.0 \quad (4\text{-}1).$$

Formula (5) is related to a ratio between the magnitudes of refractive power of negative partial lens group G3N and fourth lens group G4. When the value exceeds the upper limit of formula (5), a spherical aberration, a longitudinal chromatic aberration and a lateral chromatic aberration at wide angle end become worse, and performance deteriorates. In contrast, when the value is lower than the lower limit of formula (5), a lateral chromatic aberration at telephoto end increases.

Therefore, it is more desirable that the following formula (5-1) is satisfied instead of formula (5):

$$3.8 < |f3N|/fG4 < 7.5 \quad (5\text{-}1).$$

Formula (6) is related to allocation of refractive power to negative partial lens group G3N in the entire system. When the value exceeds the upper limit of formula (6), the refractive power of negative partial lens group G3N becomes weak, and it becomes impossible to secure a space necessary to insert a color separation optical system. Further, curvature of field is insufficiently corrected, and the performance deteriorates.

When the value is lower than the lower limit of formula (6), the refractive power of negative partial lens group G3N becomes strong. Therefore, the weight and the cost increase, because the effective diameter of positive partial lens group G3P becomes large. Further, when the value is lower than the lower limit of formula (6), if positive partial lens group G3P is used as a lens group for anti-vibration, and moved, curvature of field becomes worse.

Therefore, it is more desirable that the following formula (6-1) is satisfied instead of formula (6). Further, it is even more desirable that the following formula (6-2) is satisfied:

$$18.0 < |f3N|/fw < 35.0 \quad (6\text{-}1);$$

and $$20.0 < |f3N|/fw < 35.0 \quad (6\text{-}2).$$

According to the zoom lens in the embodiment of the present invention, it is possible to provide a high performance zoom lens having a high variable magnification ratio of, for example, about 20 times, and the size and the cost of which are reduced, by appropriately adopting the aforementioned structure. Accordingly, an excellent image is obtainable.

Here, when the zoom lens in the embodiment of the present invention needs to have environment resistance characteristics, it is desirable that a lens arranged on the most object side in the entire system is made of a glass material. The lens arranged on the most object side is constantly exposed to sun light when the zoom lens is used outdoors for a surveillance camera or the like. Therefore, if the most-object-side lens is a plastic lens, deterioration and a change in quality may occur.

When the zoom lens according to the embodiment of the present invention is used in tough conditions, it is desirable that a multi-layer coating for protection is applied. Besides the coating for protection, an anti-reflection coating for reducing ghost light or the like during usage may be applied.

In the example illustrated in FIG. 1, optical members PP1, PP2 are arranged between the lens system and an image formation plane. Instead of arranging various filters, such as a low-pass filter and a filter that cuts a specific wavelength band, the various filters may be arranged between lenses. Alternatively, a coating having a similar action to various filters may be applied to a lens surface of one of the lenses.

Next, numerical value examples of the zoom lens in the present invention will be described. FIG. 1 through FIG. 5 illustrate lens cross sections of the zoom lenses in Examples 1 through 5, respectively.

Table 1 shows basic lens data on a zoom lens of Example 1, and Table 2 shows data about zoom, and Table 3 shows aspheric surface data. Similarly, Table 4 through Table 15 show basic lens data, data about zoom and aspheric surface data about zoom lenses of Examples 2 through 5. Next, the meanings of signs in the tables will be described, using the tables of Example 1 as an example. The meaning of signs in the tables of Examples 2 through 5 are basically similar.

In the basic lens data of Table 1, the column Si shows the surface numbers of i-th (i=1, 2, 3, . . . ) surfaces. The surface number of the object-side surface of the most-object-side composition element is one, and the surface numbers sequentially increase toward the image side. The column Ri shows the curvature radius of the i-th surface. The column Di shows a surface distance, on optical axis Z, between the i-th surface and the (i+1) th surface. The sign of a curvature radius is positive when the shape of a surface is convex toward the object side, and negative when the shape of a surface is convex toward the image side.

In the basic lens data, the column Ndj shows the refractive index of a j-th (j=1, 2, 3, . . . ) composition element with respect to d-line (wavelength is 587.6 nm) when the most-object-side lens is the first composition element, and the value of j sequentially increases toward the image side. Further the column of vdj shows the Abbe number of the j-th composition element with respect to d-line. The basic lens data include aperture stop St. Further, "∞ (APERTURE STOP)" is written in the row of the column of curvature radius corresponding to aperture stop St.

In the basic lens data of Table 1, D7, D14, D22 and D27 are distances that change during magnification change. D7 is a distance between first lens group G1 and second lens group G2. D14 is a distance between second lens group G2 and aperture stop St. D22 is a distance between third lens group G3 and fourth lens group G4. D27 is a distance between fourth lens group G4 and optical member PP1. However in Example 2, D23 and D28 are used instead of D22 and D27, respectively. In Example 3, D23 and D29 are used instead of D22 and D27, respectively.

Data about zoom in Table 2 show the focal length (f') of the entire system, F-number (Fno.), full angle of view (2ω) and distances between surfaces that change during magnification change at wide angle end, at a middle focal length position, and at telephoto end.

In the lens data of Table 1, mark * is attached to the surface number of an aspheric surface. Table 1 shows, as the curvature radius of an aspheric surface, the numerical value of a paraxial curvature radius. The aspheric surface data in Table 3 show the surface numbers of aspheric surfaces, and aspheric surface coefficients about the aspheric surfaces. In the numerical values of the aspheric surface data in Table 3, "E-n" (n: integer) means "×10⁻ⁿ". The aspheric surface coefficients are coefficients KA, Am (m=3, 4, 5, . . . 20) in the following aspheric surface equation:

$$Zd = C \cdot h^2 / \{1 + (1 - K \cdot C^2 \cdot h)^{1/2}\} + \Sigma Am \cdot h^m,$$

where $Zd$: depth of aspheric surface (the length of a perpendicular from a point on the aspheric surface at height h to a flat plane that contacts with the vertex of the aspheric surface and is perpendicular to the optical axis), h: height (a length from the optical axis to the lens surface), C: a reciprocal of a paraxial curvature radius, and KA, Am: aspheric surface coefficients (m=3, 4, 5, . . . 20).

The following tables show values rounded to predetermined digits. Further, the data in the following tables use degree, as the unit of an angle, and mm, as the unit of a length. However, since an optical system can be used by proportionally enlarging or reducing the optical system, other appropriate units may be used.

TABLE 1

EXAMPLE 1 BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 1 | 250.7598 | 1.600 | 1.80518 | 25.42 |
| 2 | 48.6740 | 7.600 | 1.49700 | 81.54 |
| 3 | −348.4504 | 0.100 | | |
| 4 | 77.7952 | 4.120 | 1.48749 | 70.23 |
| 5 | ∞ | 0.100 | | |
| 6 | 39.1435 | 4.670 | 1.83431 | 42.73 |
| 7 | 117.6708 | D7 | | |
| 8 | 54.6980 | 0.800 | 1.88300 | 40.76 |
| 9 | 7.7894 | 4.538 | | |
| 10 | −23.9059 | 0.740 | 1.83481 | 42.73 |
| 11 | 38.7462 | 0.100 | | |
| 12 | 17.3200 | 4.520 | 1.84661 | 23.78 |

TABLE 1-continued

EXAMPLE 1 BASIC LENS DATA

| Si (SURFACE NUMBER) | Ri (CURVATURE RADIUS) | Di (SURFACE DISTANCE) | Ndj (REFRACTIVE INDEX) | ν dj (ABBE NUMBER) |
|---|---|---|---|---|
| 13 | −17.3200 | 0.760 | 1.83481 | 42.73 |
| 14 | 109.0569 | D14 | | |
| 15 | ∞(APERTURE STOP) | 3.500 | | |
| 16 | ∞ | 3.340 | 1.80000 | 29.84 |
| 17 | −16.8870 | 0.960 | 1.83481 | 42.73 |
| 18 | 107.1027 | 0.800 | | |
| *19 | 15.7994 | 4.380 | 1.56867 | 58.50 |
| *20 | −49.4238 | 0.100 | | |
| 21 | 26.1929 | 0.900 | 1.84661 | 23.78 |
| 22 | 16.4499 | D22 | | |
| 23 | 32.3980 | 3.790 | 1.58144 | 40.75 |
| 24 | −32.3980 | 0.800 | 1.76182 | 26.52 |
| 25 | 18.9224 | 0.610 | | |
| *26 | 14.1758 | 4.410 | 1.56867 | 58.50 |
| *27 | −19.0673 | D27 | | |
| 28 | ∞ | 15.000 | 1.58913 | 61.20 |
| 29 | ∞ | 2.100 | 1.51632 | 64.00 |
| 30 | ∞ | 0.376 | | |
| 31 | ∞ | | | |

*ASPHERIC SURFACE

TABLE 2

EXAMPLE 1 DATA ABOUT ZOOM

| FACTORS | WIDE-ANGLE END | MIDDLE | TELEPHOTO END |
|---|---|---|---|
| f | 4.677 | 27.782 | 91.205 |
| Fno | 1.66 | 2.72 | 3.40 |
| 2ω | 69.4 | 12.6 | 3.8 |
| D7 | 0.900 | 27.834 | 36.595 |
| D14 | 37.859 | 10.924 | 2.163 |
| D22 | 11.155 | 5.254 | 11.134 |
| D27 | 8.948 | 14.848 | 8.968 |

TABLE 3

EXAMPLE 1 ASPHERIC SURFACE DATA

| SURFACE NUMBER | 19 | 20 | 26 | 27 |
|---|---|---|---|---|
| K | 1.00000000E+00 | 1.00000000E+00 | 1.00000000E+00 | 3.57886951E+00 |
| A3 | | | −1.36918394E−04 | −2.08109713E−04 |
| A4 | −3.14447649E−05 | 2.11651190E−05 | 6.76723348E−06 | 3.09682649E−04 |
| A5 | | | −1.98105217E−05 | −2.15509699E−04 |
| A6 | −1.74721737E−07 | −1.36868607E−07 | 3.72435462E−06 | 1.28101684E−04 |
| A7 | | | −6.67352282E−07 | −4.75522399E−05 |
| A8 | 8.61594422E−09 | 1.14169650E−08 | 9.91948178E−08 | 1.06297164E−05 |
| A9 | | | −1.12967242E−08 | −1.23864247E−06 |
| A10 | −1.31796465E−10 | −1.84045106E−10 | 2.37155758E−09 | 1.78786119E−08 |
| A11 | | | −5.13026285E−10 | 1.38727419E−08 |
| A12 | 1.39004516E−12 | 1.88316182E−12 | 6.38147685E−11 | −1.60925975E−09 |
| A13 | | | −4.44165479E−12 | 5.94914933E−11 |
| A14 | | | −1.56591346E−13 | |
| A15 | | | 3.98798742E−14 | |
| A16 | | | 2.52723074E−17 | |
| A17 | | | 1.81957804E−15 | |
| A18 | | | −3.48739460E−16 | |
| A19 | | | 5.27494131E−18 | |
| A20 | | | 1.22120465E−18 | |

TABLE 4

EXAMPLE 2 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 155.5221 | 1.600 | 1.80518 | 25.42 |
| 2 | 49.9402 | 6.831 | 1.49700 | 81.54 |
| 3 | −704.1477 | 0.100 | | |
| 4 | 49.8165 | 4.520 | 1.48749 | 70.23 |
| 5 | 235.0047 | 0.100 | | |
| 6 | 42.1544 | 2.650 | 1.83481 | 42.73 |
| 7 | 85.7510 | D7 | | |
| 8 | 35.7603 | 0.800 | 1.88300 | 40.76 |
| 9 | 7.2788 | 4.358 | | |
| 10 | −21.4061 | 0.700 | 1.83481 | 42.71 |
| 11 | 29.6010 | 0.100 | | |
| 12 | 16.4433 | 3.444 | 1.84666 | 23.78 |
| 13 | −21.5162 | 0.750 | 1.83481 | 42.71 |
| 14 | −302.9022 | D14 | | |
| 15 | ∞(APERTURE STOP) | 3.500 | | |
| 16 | 16.9342 | 4.320 | 1.56732 | 42.82 |
| 17 | −124.1512 | 1.500 | 1.80400 | 46.58 |
| 18 | 18.6655 | 1.801 | | |
| 19 | 19.2914 | 3.695 | 1.51633 | 64.14 |
| 20 | −28.0603 | 0.916 | 1.84666 | 23.78 |
| 21 | −60.8138 | 0.426 | | |
| *22 | 40.5227 | 1.832 | 1.56867 | 58.50 |
| *23 | 36.5018 | D23 | | |
| *24 | 22.5859 | 4.939 | 1.56867 | 58.50 |
| *25 | −21.2435 | 0.108 | | |
| 26 | 39.0413 | 4.338 | 1.48749 | 70.23 |
| 27 | −22.7442 | 1.365 | 1.80000 | 29.84 |
| 28 | 62.1955 | D28 | | |
| 29 | ∞ | 15.000 | 1.58913 | 61.20 |
| 30 | ∞ | 2.100 | 1.51632 | 64.00 |
| 31 | ∞ | 1.190 | | |
| 32 | ∞ | | | |

*ASPHERIC SURFACE

TABLE 5

EXAMPLE 2 DATA ABOUT ZOOM

| FACTORS | WIDE-ANGLE END | MIDDLE | TELEPHOTO END |
|---|---|---|---|
| f | 4.647 | 27.600 | 90.607 |
| Fno | 1.66 | 2.78 | 3.51 |
| 2ω | 69.7 | 12.9 | 3.9 |
| D7 | 0.900 | 30.235 | 40.395 |
| D14 | 41.810 | 12.475 | 2.315 |
| D23 | 11.301 | 5.134 | 10.112 |
| D28 | 3.000 | 9.167 | 4.189 |

TABLE 6

EXAMPLE 2 ASPHERIC SURFACE DATA

| SURFACE NUMBER | 22 | 23 | 24 | 25 |
|---|---|---|---|---|
| K | 1.00000000E+00 | 1.00000000E+00 | 3.63853717E+00 | 1.00000000E+00 |
| A3 | | | −1.33407927E−04 | −1.45379380E−04 |
| A4 | 3.50380068E−05 | 7.35536188E−05 | −5.93455243E−05 | 1.13900776E−05 |
| A5 | | | 7.66282638E−07 | −6.47858267E−06 |
| A6 | −1.11182925E−06 | −1.11641322E−06 | −2.44432676E−06 | 2.76942736E−07 |
| A7 | | | 4.80979476E−07 | 6.29228443E−09 |
| A8 | −7.72670605E−10 | 8.44995104E−10 | −6.48921240E−08 | −4.92090963E−09 |
| A9 | | | 4.38347449E−09 | −2.34520354E−10 |
| A10 | 1.32713551E−10 | 1.21319808E−10 | −1.65561602E−10 | −5.51556292E−11 |
| A11 | | | −5.10522795E−12 | 1.68449079E−13 |
| A12 | −5.57942911E−13 | −4.92911854E−13 | −8.97697963E−13 | 1.48661862E−13 |
| A13 | | | −1.06979633E−13 | 1.26923401E−14 |
| A14 | | | −4.46932418E−15 | −5.15360138E−15 |
| A15 | | | 9.44650077E−16 | −3.98629106E−16 |
| A16 | | | 1.49497552E−16 | −8.66472597E−17 |
| A17 | | | 2.57315617E−17 | −6.97917107E−18 |
| A18 | | | 1.32156404E−18 | −8.18884536E−19 |
| A19 | | | −3.09994989E−19 | 5.45687036E−20 |
| A20 | | | −1.18044755E−19 | 4.28099515E−21 |

TABLE 7

EXAMPLE 3 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | −490.8623 | 1.600 | 1.69895 | 30.13 |
| 2 | 56.5667 | 7.380 | 1.49700 | 81.54 |
| 3 | −136.7876 | 0.100 | | |
| 4 | 64.6103 | 4.000 | 1.67790 | 55.34 |
| 5 | 511.1716 | 0.100 | | |
| 6 | 43.3441 | 3.694 | 1.69680 | 55.53 |
| 7 | 109.2195 | D7 | | |
| 8 | 59.3658 | 0.800 | 1.88300 | 40.76 |
| 9 | 8.3056 | 3.808 | | |
| 10 | −25.5450 | 0.740 | 1.83481 | 42.73 |
| 11 | 40.5972 | 0.537 | | |
| 12 | 18.8140 | 3.696 | 1.84666 | 23.78 |
| 13 | −20.5164 | 0.750 | 1.83481 | 42.73 |
| 14 | 133.8479 | D14 | | |
| 15 | ∞(APERTURE STOP) | 3.500 | | |
| 16 | 127.4482 | 5.000 | 1.70154 | 41.24 |
| 17 | −16.9208 | 0.810 | 1.83481 | 42.73 |

TABLE 7-continued

EXAMPLE 3 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 18 | 164.2555 | 1.300 | | |
| 19 | 15.3905 | 5.000 | 1.55880 | 62.55 |
| 20 | −33.5725 | 0.900 | 1.83481 | 42.73 |
| 21 | −111.0514 | 2.869 | | |
| *22 | 36.4775 | 1.635 | 1.55880 | 62.55 |
| *23 | 23.9027 | D23 | | |
| 24 | 21.4031 | 5.100 | 1.48749 | 70.23 |
| 25 | −18.3236 | 1.264 | | |
| 26 | −17.2466 | 0.800 | 1.69895 | 30.05 |
| 27 | 43.1028 | 0.100 | | |
| *28 | 17.7384 | 3.909 | 1.58913 | 61.15 |
| *29 | −32.3284 | D29 | | |
| 30 | ∞ | 15.000 | 1.58913 | 61.20 |
| 31 | ∞ | 2.100 | 1.51632 | 64.00 |

TABLE 7-continued

EXAMPLE 3 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 32 | ∞ | 1.201 | | |
| 33 | ∞ | | | |

*ASPHERIC SURFACE

TABLE 8

EXAMPLE 3 DATA ABOUT ZOOM

| FACTORS | WIDE-ANGLE END | MIDDLE | TELEPHOTO END |
|---|---|---|---|
| f | 4.685 | 27.827 | 91.352 |
| Fno | 1.66 | 2.79 | 3.51 |
| 2ω | 69.7 | 12.4 | 3.8 |
| D7 | 0.900 | 30.616 | 39.886 |
| D14 | 41.363 | 11.648 | 2.377 |
| D23 | 9.196 | 3.803 | 9.550 |
| D29 | 3.000 | 8.393 | 2.646 |

TABLE 9

EXAMPLE 3 ASPHERIC SURFACE DATA

| SURFACE NUMBER | 22 | 23 | 28 | 29 |
|---|---|---|---|---|
| K | 1.00000000E+00 | 1.00000000E+00 | 1.00000000E+00 | 4.78618703E+00 |
| A3 | | | 2.08256833E−04 | 2.08766344E−04 |
| A4 | 4.08694719E−05 | 1.13742309E−04 | −1.94241795E−05 | 2.21351063E−04 |
| A5 | | | 5.95164380E−06 | −1.95786972E−04 |
| A6 | −1.14836084E−06 | −9.73243888E−07 | −2.40347223E−07 | 1.26918915E−04 |
| A7 | | | −1.45235634E−08 | −4.76832259E−05 |
| A8 | 1.74083373E−09 | 2.77911345E−09 | 6.11167447E−09 | 1.06255600E−05 |
| A9 | | | 3.12659313E−10 | −1.23318625E−06 |
| A10 | 1.24497361E−10 | 1.37390935E−10 | 8.23443050E−11 | 1.79562855E−08 |
| A11 | | | 3.46148990E−12 | 1.38031034E−08 |
| A12 | −8.27365333E−13 | −3.49439535E−13 | 2.29472223E−13 | −1.60745733E−09 |
| A13 | | | 7.81799570E−15 | 5.97780395E−11 |
| A14 | | | 4.58516679E−15 | |
| A15 | | | −6.38408058E−18 | |
| A16 | | | −3.00851706E−17 | |
| A17 | | | −1.03536300E−17 | |
| A18 | | | −1.59020664E−18 | |
| A19 | | | −5.20456299E−20 | |
| A20 | | | 8.04179241E−20 | |

TABLE 10

EXAMPLE 4 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 315.7842 | 1.600 | 1.80518 | 25.42 |
| 2 | 50.5194 | 7.597 | 1.49700 | 81.54 |
| 3 | −247.4440 | 0.100 | | |
| 4 | 76.2303 | 4.200 | 1.48749 | 70.23 |
| 5 | ∞ | 0.100 | | |
| 6 | 39.0568 | 4.577 | 1.83481 | 42.73 |
| 7 | 114.0458 | D7 | | |
| 8 | 56.0520 | 0.800 | 1.88300 | 40.76 |
| 9 | 7.8329 | 4.501 | | |
| 10 | −23.9891 | 0.740 | 1.83481 | 42.73 |
| 11 | 41.4101 | 0.100 | | |
| 12 | 17.3746 | 4.271 | 1.84661 | 23.78 |
| 13 | −17.3746 | 0.760 | 1.83481 | 42.73 |
| 14 | 93.3845 | D14 | | |

TABLE 10-continued

EXAMPLE 4 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 15 | ∞(APERTURE STOP) | 3.500 | | |
| 16 | ∞ | 2.395 | 1.80518 | 25.42 |
| 17 | −24.0507 | 0.810 | 1.83481 | 42.73 |
| 18 | 87.9950 | 0.800 | | |
| *19 | 14.9305 | 4.600 | 1.56867 | 58.50 |
| *20 | −34.3615 | 0.739 | | |
| 21 | 41.5071 | 2.064 | 1.80518 | 25.42 |
| 22 | 16.9977 | D22 | | |
| 23 | 39.8867 | 2.827 | 1.58913 | 61.14 |
| 24 | −29.8849 | 0.800 | 1.76182 | 26.52 |
| 25 | 31.9930 | 0.777 | | |
| *26 | 16.8922 | 3.997 | 1.56867 | 58.50 |
| *27 | −20.7747 | D27 | | |
| 28 | ∞ | 15.000 | 1.58913 | 61.20 |
| 29 | ∞ | 2.100 | 1.51632 | 64.00 |
| 30 | ∞ | 5.288 | | |
| 31 | ∞ | | | |

*ASPHERIC SURFACE

TABLE 11

EXAMPLE 4 DATA ABOUT ZOOM

| FACTORS | WIDE-ANGLE END | MIDDLE | TELEPHOTO END |
|---|---|---|---|
| f | 4.664 | 27.701 | 90.939 |
| Fno | 1.66 | 2.72 | 3.40 |
| 2ω | 69.5 | 12.6 | 3.8 |
| D7 | 0.900 | 27.611 | 36.336 |
| D14 | 37.499 | 10.787 | 2.063 |
| D22 | 10.970 | 5.202 | 11.228 |
| D27 | 3.000 | 8.769 | 2.742 |

TABLE 12

EXAMPLE 4 ASPHERIC SURFACE DATA

| SURFACE NUMBER | 19 | 20 | 26 | 27 |
|---|---|---|---|---|
| K | 1.00000000E+00 | 1.00000000E+00 | 1.00000000E+00 | 2.85815420E−01 |
| A3 | | | 1.67073876E−04 | 2.84879791E−05 |
| A4 | −5.35007539E−05 | 1.69870905E−05 | −1.39477629E−04 | 1.71152703E−04 |
| A5 | | | 1.48836678E−05 | −2.09301450E−04 |
| A6 | 9.82778700E−08 | 2.31821831E−07 | 2.17964124E−06 | 1.30153315E−04 |
| A7 | | | −1.01568229E−06 | −4.78946085E−05 |
| A8 | 8.93954505E−10 | −2.52604419E−10 | 1.21417386E−07 | 1.06373522E−05 |
| A9 | | | −1.12721202E−08 | −1.24470162E−06 |
| A10 | −4.64655462E−11 | −2.98662753E−11 | 2.91690747E−09 | 1.85083117E−08 |
| A11 | | | −5.27729243E−10 | 1.39151429E−08 |
| A12 | 8.29229269E−13 | 8.24194311E−13 | 5.66649844E−11 | −1.60380757E−09 |
| A13 | | | −4.38339534E−12 | 5.82909184E−11 |
| A14 | | | −9.47835166E−14 | |
| A15 | | | 3.01855287E−14 | |
| A16 | | | 2.87853299E−15 | |
| A17 | | | 1.49037034E−15 | |
| A18 | | | −3.48975554E−16 | |
| A19 | | | 7.34251528E−18 | |
| A20 | | | 1.10593348E−18 | |

TABLE 13

EXAMPLE 5 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 124.0406 | 1.600 | 1.80518 | 25.42 |
| 2 | 48.8600 | 6.245 | 1.49700 | 81.54 |
| 3 | −24657.2112 | 0.100 | | |
| 4 | 78.6071 | 3.994 | 1.48749 | 70.23 |
| 5 | ∞ | 0.100 | | |
| 6 | 36.5814 | 4.662 | 1.72916 | 54.68 |
| 7 | 103.4773 | D7 | | |
| 8 | 69.0382 | 0.800 | 1.88300 | 40.76 |
| 9 | 7.8422 | 4.451 | | |
| 10 | −23.1281 | 0.740 | 1.83481 | 42.73 |
| 11 | 40.9474 | 0.100 | | |
| 12 | 17.5641 | 4.211 | 1.84661 | 23.78 |
| 13 | −17.5641 | 0.760 | 1.83481 | 42.73 |
| 14 | 102.8191 | D14 | | |
| 15 | ∞(APERTURE STOP) | 3.500 | | |
| 16 | ∞ | 2.291 | 1.80518 | 25.42 |
| 17 | −24.7532 | 0.810 | 1.83481 | 42.73 |
| 18 | 82.2980 | 0.800 | | |
| *19 | 14.7304 | 4.600 | 1.56867 | 58.50 |
| *20 | −34.1956 | 0.375 | | |
| 21 | 41.6079 | 2.127 | 1.80518 | 25.42 |
| 22 | 17.1029 | D22 | | |
| 23 | 40.7060 | 2.699 | 1.58913 | 61.14 |
| 24 | −32.9471 | 0.800 | 1.76182 | 26.52 |
| 25 | 32.5502 | 0.672 | | |
| *26 | 17.1023 | 3.980 | 1.56867 | 58.50 |
| *27 | −20.6319 | D27 | | |
| 28 | ∞ | 15.000 | 1.58913 | 61.20 |
| 29 | ∞ | 2.100 | 1.51632 | 64.00 |
| 30 | ∞ | 5.437 | | |
| 31 | ∞ | | | |

*ASPHERIC SURFACE

TABLE 14

EXAMPLE 5 DATA ABOUT ZOOM

| FACTORS | WIDE-ANGLE END | MIDDLE | TELEPHOTO END |
|---|---|---|---|
| f | 4.693 | 27.876 | 91.514 |
| Fno | 1.66 | 2.72 | 3.41 |
| 2ω | 69.1 | 12.5 | 3.8 |
| D7 | 0.900 | 26.812 | 35.360 |
| D14 | 36.275 | 10.364 | 1.815 |
| D22 | 11.255 | 5.366 | 11.132 |
| D27 | 3.000 | 8.889 | 3.123 |

TABLE 15

EXAMPLE 5 ASPHERIC SURFACE DATA

| SURFACE NUMBER | 19 | 20 | 26 | 27 |
|---|---|---|---|---|
| K | 1.00000000E+00 | 1.00000000E+00 | 1.00000000E+00 | 4.31221900E−02 |
| A3 | | | 1.77918674E−04 | 4.04662020E−05 |
| A4 | −5.24879815E−05 | 2.18634731E−05 | −1.41751568E−04 | 1.64904818E−04 |
| A5 | | | 1.54059407E−05 | −2.08837233E−04 |
| A6 | 1.25295526E−07 | 2.79281751E−07 | 2.26727314E−06 | 1.30255264E−04 |
| A7 | | | −1.03435188E−06 | −4.79189447E−05 |
| A8 | 1.34512278E−09 | −6.43165553E−11 | 1.21509928E−07 | 1.06375336E−05 |
| A9 | | | −1.16243845E−08 | −1.24502784E−06 |
| A10 | −6.04006385E−11 | −4.39293326E−11 | 2.92287172E−09 | 1.85205240E−08 |
| A11 | | | −5.20250799E−10 | 1.39205257E−08 |
| A12 | 1.21672732E−12 | 1.31308525E−12 | 5.79520999E−11 | −1.60292901E−09 |
| A13 | | | −4.67985770E−12 | 5.81632341E−11 |
| A14 | | | −1.02010603E−13 | |
| A15 | | | 2.62294261E−14 | |
| A16 | | | 3.34987720E−15 | |
| A17 | | | 1.94272502E−15 | |
| A18 | | | −4.04831711E−16 | |
| A19 | | | 4.25741377E−18 | |
| A20 | | | 1.56116344E−18 | |

In all of Examples 1 through 5, each system consists of positive first lens group G1, negative second lens group G2, positive third lens group G3, and positive fourth lens group G4, which are arranged in this order from an object side. Further, first lens group G1 and third lens group G3 are fixed relative to an image plane with respect to an optical axis direction, and second lens group G2 moves, along optical axis Z, toward an image side, and fourth lens group G4 moves in the optical axis direction when magnification is changed from wide angle end to telephoto end. In this manner, a fluctuation of an image plane caused by magnification change or by a fluctuation of a distance to an object is corrected. Further, in all of Examples 1 through 5, third lens group G3 consists of negative partial lens group G3N having negative refractive power, and which includes a cemented lens, and positive partial lens group G3P having positive refractive power, which are in this order from the object side, and the positive partial lens group G3P is moved in a direction perpendicular to optical axis Z to correct displacement of an image when the zoom lens has vibrated.

Table 16 shows values corresponding to formulas (1) through (6) in the zoom lenses of Examples 1 through 5. Table 16 shows values for d-line.

TABLE 16

| FORMULA | EXAMPLE 1 | EXAMPLE 2 | EXAMPLE 3 | EXAMPLE 4 | EXAMPLE 5 |
|---|---|---|---|---|---|
| (1) f3P/|f3N| | 0.31 | 0.22 | 0.24 | 0.32 | 0.34 |
| (2) ν 1p | 64.8 | 64.8 | 64.1 | 64.8 | 68.8 |
| (3) f3P/fG1 | 0.623 | 0.631 | 0.595 | 0.596 | 0.586 |
| (4) |f3N|/fG3 | 2.2 | 3.0 | 3.1 | 2.0 | 2.5 |
| (5) |f3N|/fG4 | 4.2 | 6.8 | 5.7 | 4.2 | 4.0 |
| (6) |f3N|/fw | 21.8 | 34.8 | 29.3 | 20.1 | 18.9 |

FIG. 6, Sections A through D illustrate a spherical aberration, astigmatism, distortion (distortion aberration), and a lateral chromatic aberration (a chromatic aberration of magnification) of the zoom lens of Example 1 at wide angle end, respectively. FIG. 6, Sections E through H illustrate a spherical aberration, astigmatism, distortion (distortion aberration), and a lateral chromatic aberration (a chromatic aberration of magnification) of the zoom lens of Example 1 at a middle focal length position, respectively. FIG. 6, Sections I through L illustrate a spherical aberration, astigmatism, distortion (distortion aberration), and a lateral chromatic aberration (a chromatic aberration of magnification) of the zoom lens of Example 1 at telephoto end, respectively.

Each of the aberration diagrams uses d-line, as reference. Further, the diagram of a spherical aberration illustrates aberrations also for g-line (wavelength is 435.8 nm) and for C-line (wavelength is 656.3 nm). Further, the diagram of a lateral chromatic aberration illustrates aberrations also for g-line and for C-line. In the diagram of astigmatism, an aberration in a sagittal direction is indicated by a solid line, and an aberration in a tangential direction is indicated by a broken line. In the diagram of a spherical aberration, Fno. represents F-number, and in the other aberration diagrams, ω represents a half angle of view.

Similarly, FIG. 7, Sections A through L illustrate aberration diagrams of the zoom lens of Example 2 at wide angle end, at a middle focal length position, and at telephoto end. FIG. 8, Sections A through L illustrate aberration diagrams of the zoom lens of Example 3 at wide angle end, at a middle focal length position, and at telephoto end. FIG. 9, Sections A through L illustrate aberration diagrams of the zoom lens of Example 4 at wide angle end, at a middle focal length position, and at telephoto end. FIG. 10, Sections A through L illustrate aberration diagrams of the zoom lens of Example 5 at wide angle end, at a middle focal length position, and at telephoto end.

Next, an imaging apparatus according to an embodiment of the present invention will be described. FIG. 11 is a schematic diagram illustrating the configuration of an imaging apparatus 10 using the zoom lens 1 according to an embodiment of the present invention, as an example of an imaging apparatus according to an embodiment of the present invention. The imaging apparatus is, for example, a surveillance camera, a video camera, an electronic still camera, and the like.

The imaging apparatus 10 illustrated in FIG. 11 includes the zoom lens 1, a filter 2, an imaging device 3, a signal processing unit 4, a variable magnification control unit 5, and a focus control unit 6. The filter 2 is arranged on the image side of the zoom lens 1. The imaging device 3 images an image of a subject formed by the zoom lens 1. The signal processing unit 4 performs operation processing on an output signal that has been output from the imaging device 3. The variable magnification control unit 5 changes magnification of the zoom lens 1. The focus control unit 6 adjusts focus.

The zoom lens 1 includes positive first lens group G1, which is fixed during magnification change, negative second lens group G2, which moves along optical axis Z during magnification change, aperture stop St, positive third lens group G3, which is fixed during magnification change, and fourth lens group G4, which moves along optical axis Z during magnification change or during fluctuation of a distance to an object to adjust focus. In FIG. 11, each lens group is schematically illustrated. The imaging device 3 images an optical image formed by the zoom lens 1, and outputs an electrical signal. The imaging surface of the imaging device 3 is arranged so as to match to the image plane of the zoom lens 1. For example, a CCD, a CMOS and the like may be used as the imaging device 3.

Although FIG. 11 does not illustrate, the imaging apparatus 10 may further include a blur correction control unit. The blur correction control unit moves positive partial lens group G3P, which has positive refractive power and constitutes a part of third lens group G3, in a direction perpendicular to optical axis Z to correct a blur in an image to be imaged caused by vibration and hand shake.

So far, the present invention has been described by using embodiments and examples. However, the present invention is not limited to the aforementioned embodiments nor examples, and various modifications are possible. For example, values, such as a curvature radius, a distance between surfaces, a refractive index, an Abbe number, and aspheric surface coefficients of each lens element, are not limited to the values in the aforementioned numerical value examples, but may be other values.

What is claimed is:

1. A zoom lens consisting of:
a first lens group having positive refractive power;
a second lens group having negative refractive power;
a third lens group having positive refractive power; and
a fourth lens group having positive refractive power, which are arranged in this order from an object side,
wherein the first lens group and the third lens group are fixed relative to an image plane with respect to an optical axis direction, and the second lens group moves, along an optical axis, toward an image side, and the fourth lens group moves in the optical axis direction when the magnification of the zoom lens is changed from wide angle end to telephoto end, and
wherein the first lens group consists of a first lens having negative refractive power, a second lens having positive refractive power, and which is cemented to the first lens, a third lens having positive refractive power and a fourth lens having positive refractive power, which are in this order from the object side, and
wherein the third lens group consists of a negative partial lens group having negative refractive power, and which consists of a cemented lens, and a positive partial lens group having positive refractive power, which are in this order from the object side, and
wherein a most image-side lens in the positive partial lens group is a meniscus lens having a negative refractive power and having a concave surface directed toward the image side, and
wherein the following formula (1) is satisfied:

$$0.2 < f3P/|f3N| < 0.35 \quad (1), \text{where}$$

f3P: a focal length of the positive partial lens group, and
f3N: a focal length of the negative partial lens group.

2. The zoom lens, as defined in claim 1, wherein the following formula (1-1) is satisfied:

$$0.3 < f3P/|f3N| < 0.35 \quad (1\text{-}1).$$

3. The zoom lens, as defined in claim 1, wherein displacement of an image when the zoom lens has vibrated is corrected by moving the positive partial lens group in a direction perpendicular to the optical axis.

4. The zoom lens, as defined in claim 1, wherein the positive partial lens group includes a cemented lens.

5. An imaging apparatus comprising:
the zoom lens, as defined in claim 1; and
an imaging device that images an optical image formed by the zoom lens, and outputs an electrical signal.

6. The zoom lens, as defined in claim 1, wherein the following formula (2) is satisfied:

$$60.0 < \nu 1p < 70.0 \quad (2), \text{where}$$

$\nu 1p$: an average of Abbe numbers of the lenses having positive refractive power in the first lens group for d-line.

7. The zoom lens, as defined in claim 6, wherein the following formula (2-1) is satisfied:

$$64.0 < \nu 1p < 69.0 \quad (2\text{-}1).$$

8. The zoom lens, as defined in claim 1, wherein the following formula (3) is satisfied:

$$0.560 < f3P/fG1 < 0.637 \quad (3), \text{where}$$

f3P: a focal length of the positive partial lens group, and
fG1: a focal length of the first lens group.

9. The zoom lens, as defined in claim 8, wherein the following formula (3-1) is satisfied:

$$0.580 < f3P/fG1 < 0.635 \quad (3\text{-}1).$$

10. The zoom lens, as defined in claim 1, wherein the following formula (4) is satisfied:

$$2.0 \leq |f3N|/fG3 < 7.5 \quad (4), \text{where}$$

f3N: a focal length of the negative partial lens group, and
fG3: a focal length of the third lens group.

11. The zoom lens, as defined in claim 10, wherein the following formula (4-1) is satisfied:

$$2.0 \leq |f3N|/fG3 < 4.0 \quad (4\text{-}1).$$

12. The zoom lens, as defined in claim 1, wherein the following formula (5) is satisfied:

$$3.6 < |f3N|/fG4 < 10.0 \quad (5), \text{where}$$

f3N: a focal length of the negative partial lens group, and
fG4: a focal length of the fourth lens group.

13. The zoom lens, as defined in claim 12, wherein the following formula (5-1) is satisfied:

$$3.8 < |f3N|/fG4 < 7.5 \qquad (5\text{-}1).$$

14. The zoom lens, as defined in claim 1, wherein the following formula (6) is satisfied:

$$18.0 < |f3N|/fw < 60.0 \qquad (6),$$

where f3N: a focal length of the negative partial lens group, and
fw: a focal length of an entire system at wide angle end.

15. The zoom lens, as defined in claim 14, wherein the following formula (6-1) is satisfied:

$$18.0 < |f3N|/fw < 35.0 \qquad (6\text{-}1).$$

16. The zoom lens, as defined in claim 14, wherein the following formula (6-2) is satisfied:

$$20.0 < |f3N|/fw < 35.0 \qquad (6\text{-}2).$$

* * * * *